United States Patent
Scharfeld

(10) Patent No.: US 8,362,347 B1
(45) Date of Patent: Jan. 29, 2013

(54) SYSTEM AND METHODS FOR GUIDING USER INTERACTIONS WITH MUSICAL INSTRUMENTS

(75) Inventor: Tom Ahlkvist Scharfeld, Santa Barbara, CA (US)

(73) Assignee: Spoonjack, LLC, San Francisco, CA (US)

( * ) Notice: Subject to any disclaimer, the term of this patent is extended or adjusted under 35 U.S.C. 154(b) by 0 days.

(21) Appl. No.: 12/757,032

(22) Filed: Apr. 8, 2010

Related U.S. Application Data

(60) Provisional application No. 61/167,535, filed on Apr. 8, 2009.

(51) Int. Cl.
*G09B 13/02* (2006.01)

(52) U.S. Cl. ............... 84/477 R; 84/470 R; 84/483.2

(58) Field of Classification Search ............ 84/477 R, 84/470 R, 483.2
See application file for complete search history.

(56) References Cited

U.S. PATENT DOCUMENTS

| | | | | |
|---|---|---|---|---|
| 4,651,612 A * | 3/1987 | Matsumoto | ........... | 84/650 |
| 5,886,273 A * | 3/1999 | Haruyama | ........... | 84/478 |
| 6,388,181 B2 * | 5/2002 | Moe | ........... | 84/477 R |
| 6,915,488 B2 * | 7/2005 | Omori et al. | ........... | 715/773 |
| 7,164,076 B2 * | 1/2007 | McHale et al. | ........... | 84/616 |
| 7,271,329 B2 * | 9/2007 | Franzblau | ........... | 84/609 |
| 7,309,827 B2 * | 12/2007 | Sakurada | ........... | 84/616 |
| 7,321,094 B2 * | 1/2008 | Sakurada | ........... | 84/616 |
| 7,361,829 B2 * | 4/2008 | Uehara | ........... | 84/746 |
| 7,394,012 B2 * | 7/2008 | Schultz | ........... | 84/615 |
| 7,423,213 B2 * | 9/2008 | Sitrick | ........... | 84/477 R |
| 7,459,624 B2 * | 12/2008 | Schmidt et al. | ........... | 84/477 R |
| 7,674,964 B2 * | 3/2010 | Ohmura et al. | ........... | 84/478 |
| 7,714,220 B2 * | 5/2010 | Festejo | ........... | 84/485 R |
| 7,772,476 B2 * | 8/2010 | Lemons | ........... | 84/470 R |
| 7,799,984 B2 * | 9/2010 | Salter | ........... | 84/477 R |
| 7,842,877 B2 * | 11/2010 | Charles | ........... | 84/615 |
| 7,893,337 B2 * | 2/2011 | Lenz | ........... | 84/477 R |
| 7,910,818 B2 * | 3/2011 | Kim et al. | ........... | 84/477 R |
| 7,923,620 B2 * | 4/2011 | Foster | ........... | 84/477 R |
| D664,548 S * | 7/2012 | Scharfeld | ........... | D14/485 |
| 8,237,042 B2 * | 8/2012 | Scharfeld | ........... | 84/662 |
| 2002/0026866 A1 * | 3/2002 | Nishitani et al. | ........... | 84/600 |
| 2007/0044638 A1 * | 3/2007 | Egan | ........... | 84/483.2 |
| 2007/0089590 A1 * | 4/2007 | Katou | ........... | 84/609 |
| 2007/0163428 A1 * | 7/2007 | Salter | ........... | 84/611 |
| 2010/0206156 A1 * | 8/2010 | Scharfeld | ........... | 84/604 |

* cited by examiner

*Primary Examiner* — David Warren
*Assistant Examiner* — Robert W Horn

(57) ABSTRACT

A system and methods guide a user toward performing actions. Embodiments include a guidance system for helping a user play a musical instrument, a musical gaming system where users attempt to play music in accordance with the guidance instructions, and other systems or devices requiring particular user inputs. Through novel combinations of sensor inputs and processing, electronic musical instruments allow simulation of acoustic instruments including but not limited to a Trombone, Trumpet, and Saxophone. Sensor inputs are configured to trigger playback and transitioning of sound and control its various attributes alone, or in combination. To guide a user to interact with these and other instruments and devices, indicators are presented on a display. Indicators prompt actions such as touching, blowing, producing sound, shaking, and tilting, or a combination thereof. Indicators can be configured to prepare a user to take an action.

20 Claims, 20 Drawing Sheets

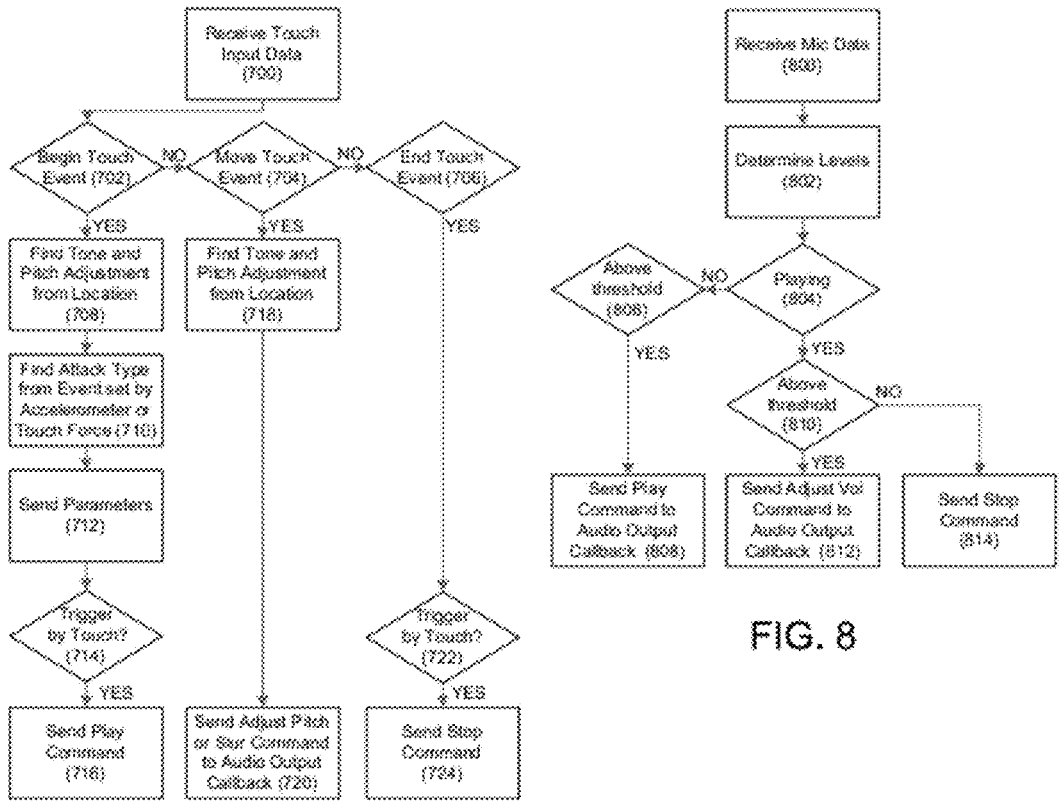
FIG. 7
FIG. 8
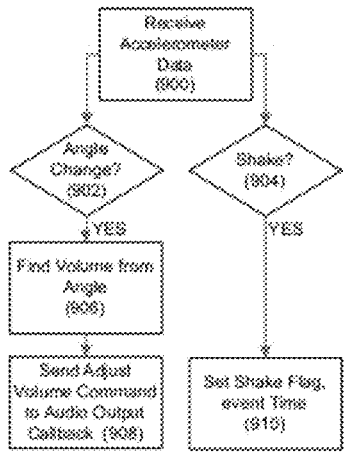
FIG. 9

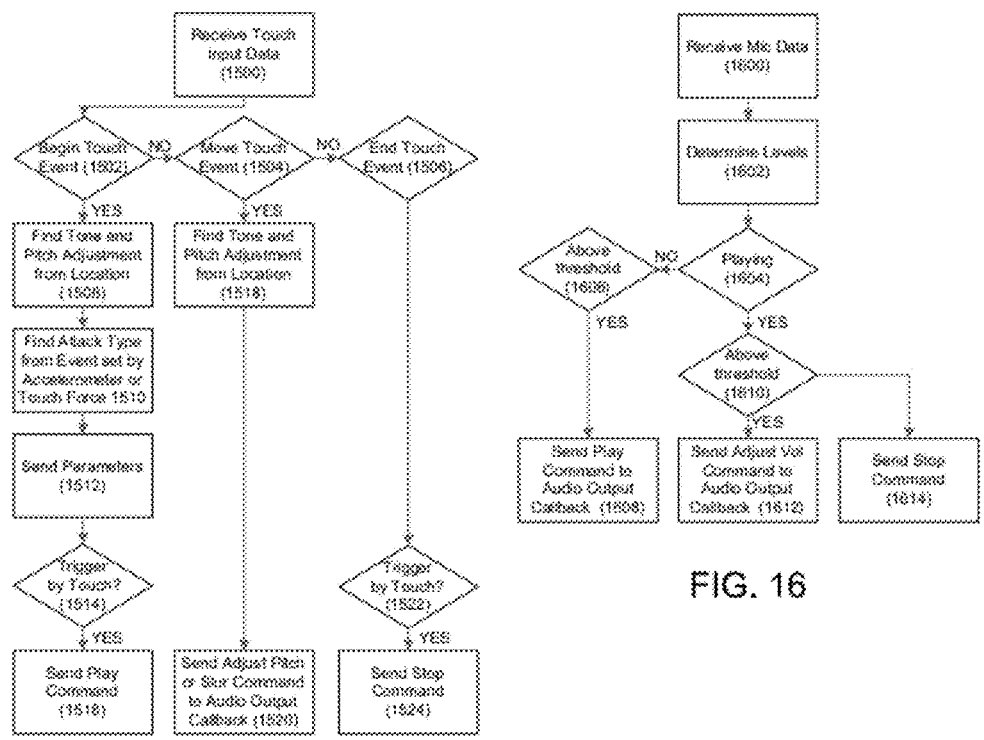
FIG. 15
FIG. 16
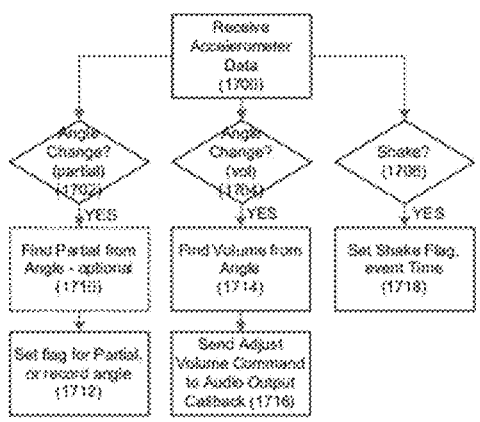
FIG. 17

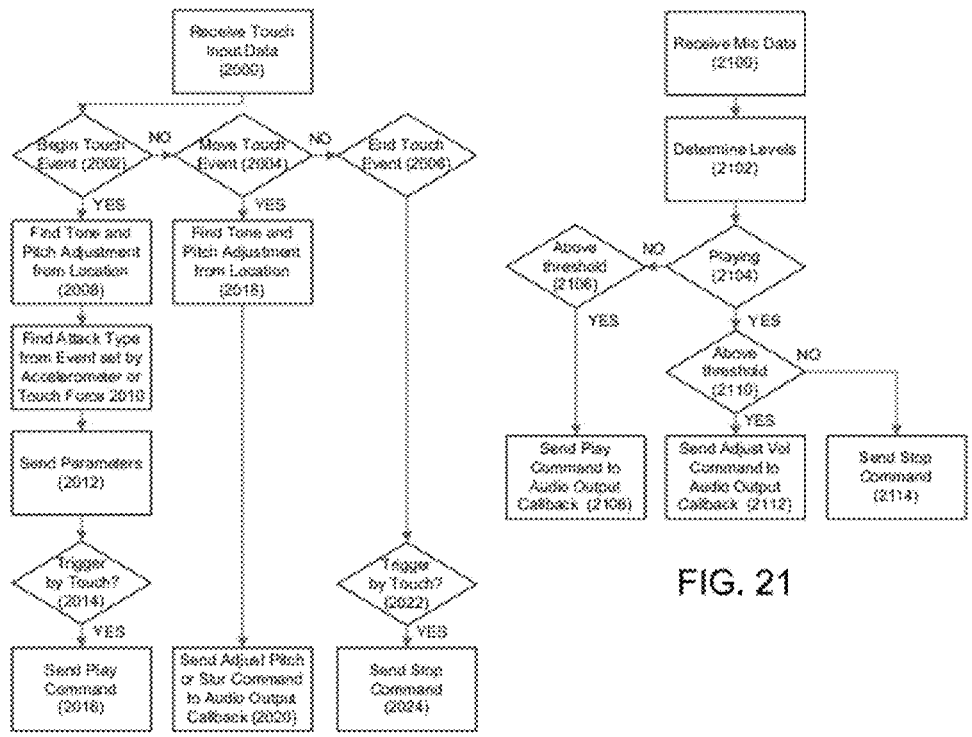
FIG. 20
FIG. 21
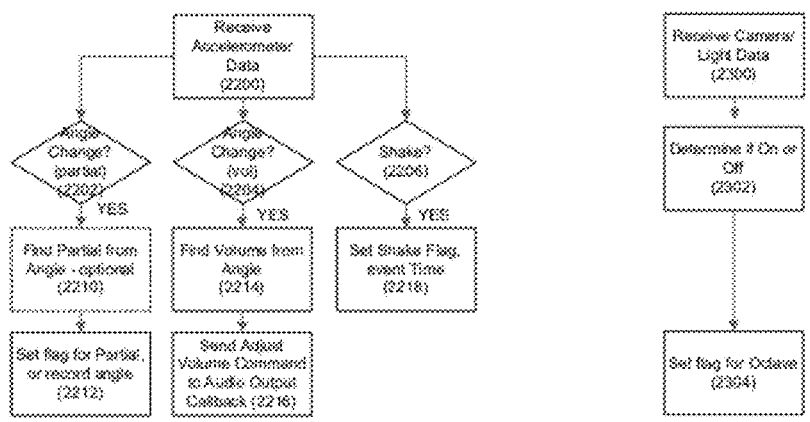
FIG. 22
FIG. 23

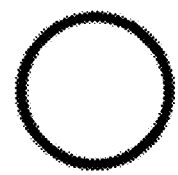
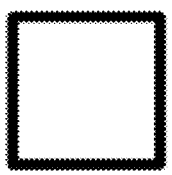
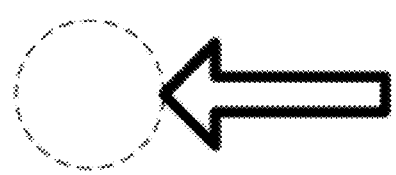
FIG. 26A          FIG. 26B          FIG. 26C
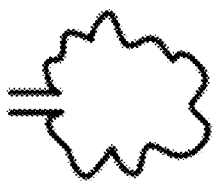
FIG. 26D          FIG. 26E          FIG. 26F
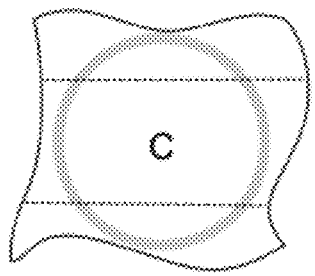
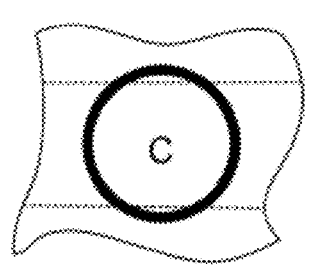
FIG. 27A          FIG. 27B

```
0, 0, Header, 1, 2, 480
1, 0, Start_track
1, 0, Title, "Example"
1, 0, Time_signature, 4, 2, 24, 8
1, 0, Tempo, 500000
1, 0, End_track
2, 0, Start_track
2, 0, Instrument, "Trombone"
2, 0, Note_on, 1, 60, 81
2, 1440, Note_off, 1, 60, 0
2, 1440, Note_on, 1, 57, 81
2, 1680, Note_off_c, 1, 57, 0
2, 1680, Note_on_c, 1, 55, 81
2, 1920, Note_off_c, 1, 55, 0
2, 1920, End_track
0, 0, End_of_file
```

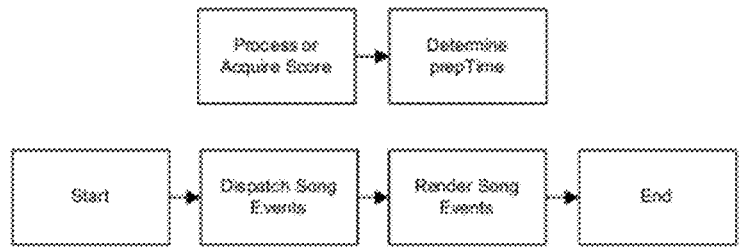
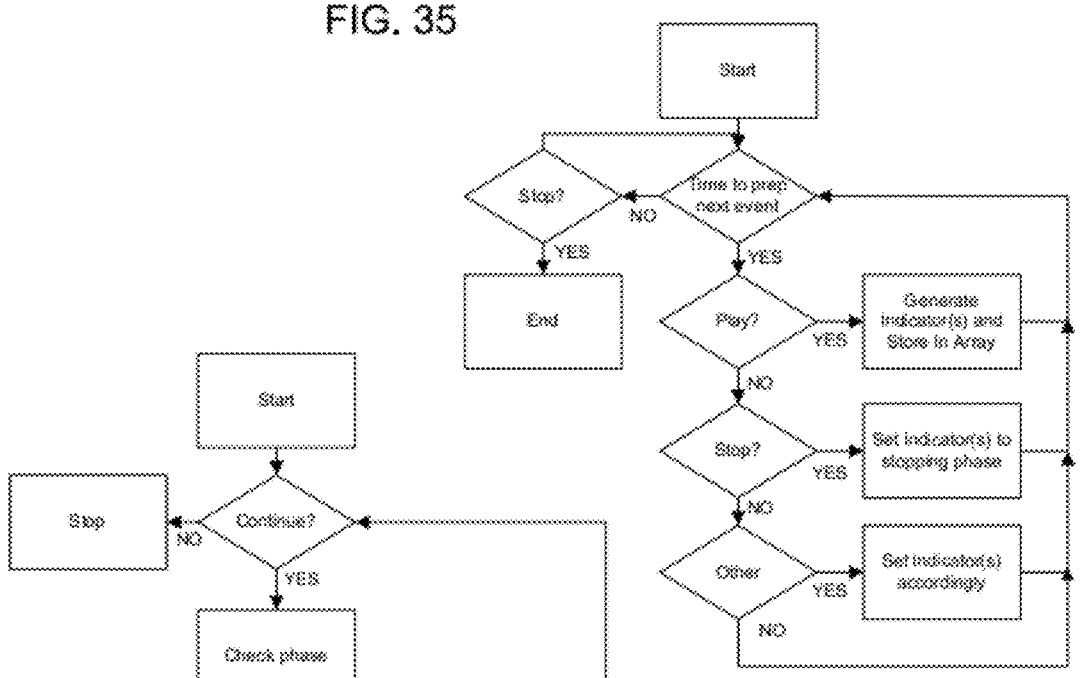
FIG. 35
FIG. 36
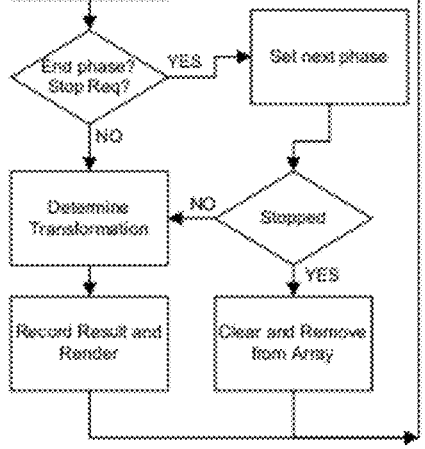
FIG. 37

SYSTEM AND METHODS FOR GUIDING USER INTERACTIONS WITH MUSICAL INSTRUMENTS

CROSS REFERENCE TO RELATED APPLICATIONS

The present invention claims priority to provisional U.S. patent application Ser. No. 61/167,535 filed Apr. 8, 2009.

FIELD OF THE INVENTION

The present invention relates to musical instruments and more specifically to guiding user interaction with musical instruments.

SUMMARY

The present invention provides a method for guiding a user toward or suggesting a particular input action at a particular time. One preferred embodiment is a learning system for an electronic musical instrument. A second preferred embodiment is for a musical gaming system. Electronic musical instruments, including simulations of real world instruments such as Trombone, Trumpet, and Saxophone, are also provided.

An electronic device includes a series of sensor inputs configured to act as a user interface, and a speaker to output sound. Various sensors can be employed, including a touch screen, microphone, accelerometer, and camera or light sensor.

Sensor inputs are processed through a set of sub-processors to determine events and respond accordingly with parameters and actions for manipulating sound. Attributes that can be varied include tone, pitch, attack/accent (also known as velocity), volume, and special modes such as vibrato, growl or tonguing. Parameters and commands are sent to a playback processor which responds to the input parameters and commands by processing stored digital representations of sounds and sends them to an output buffer for playback.

Generated sounds are stored digitally as either data, or algorithms/equations. They are contained within a Tone data object which comprises a set of representations which may provide different phases and/or qualities.

Sensor inputs can be configured to trigger playback of sound and control its various attributes either alone, or in combination. For example, Tone and pitch may be determined exclusively by location of touches on a display, or by a combination of device rotation and touch location. These methods are illustrated by a variety of embodiments including a simulated Trombone, Trumpet, and Saxophone.

In order to assist the user in playing the aforementioned instruments, or others not described here, the present invention provides a system that guides the user toward a particular action, such as hitting a proper note at the appropriate time. This is achieved by displaying an Indicator at an appropriate position and time. The indicator comprises various shapes, sizes, colors, transparency and other effects. And it may be placed at positions appropriate for the suggested action. The indicators may have various phases including a preparatory phase, a hit phase, a sustain or loop phase, and a release phase. In order to display these indicators at the right time in the right phase, a set of instructions (a digital score in the case of music) is required. The Musical Instrument Digital Interface (MIDI) protocol provides a format for representing such a set of instructions. These instructions are read periodically in a loop and events ready to be processed, are dispatched for rendering. Users actual interaction may also be tracked and compared with the suggested action for the purpose of scoring for learning or gaming. Additional learning and gaming features are also described.

Further objects, advantages, and features of the invention will become apparent from a consideration of the drawings and ensuing description.

BRIEF DESCRIPTION OF THE DRAWINGS

Presently preferred embodiments of the invention are described below in conjunction with the appended drawing figures, wherein like reference numerals refer to the like elements in the various figures, and wherein:

FIG. 7 is a flow diagram of the steps performed by the touch sensor sub-processor for the embodiment of FIG. 6.

FIG. 8 is a flow diagram of the steps performed by the mic sub-processor for the embodiment of FIG. 6.

FIG. 9 is a flow diagram of the steps performed by the accelerometer sub-processor for the embodiment of FIG. 6.

FIGS. 11 and 12 are configured to control Tone and pitch exclusively by touch, whereas FIGS. 13 and 14 are configured to control Tone and pitch by a combination of touch and rotation.

FIG. 15 is a flow diagram of the steps performed by the touch sensor sub-processor for the embodiments of FIG. 11-14.

FIG. 16 is a flow diagram of the steps performed by the mic sub-processor for the embodiment of FIG. 11-14.

FIG. 17 is a flow diagram of the steps performed by the accelerometer sub-processor for the embodiment of FIG. 11-14.

FIG. 18 is a diagram of the present invention embodied as a Saxophone.

FIG. 20 is a flow diagram of the steps performed by the touch sensor sub-processor for the embodiments of FIGS. 18 and 19.

FIG. 21 is a flow diagram of the steps performed by the mic sub-processor for the embodiments of FIGS. 18 and 19.

FIG. 22 is a flow diagram of the steps performed by the accelerometer sub-processor for the embodiments of FIGS. 18 and 19.

FIG. 23 is a flow diagram of the steps performed by the camera sub-processor for the embodiments of FIGS. 18 and 19.

FIGS. 26A-F show indicators for the present invention for guiding a user towards particular actions.

FIGS. 27A,B is a diagram showing the variation of an indicator during the preparation phase where a user is prepared to press the C note area. FIG. 27B is a later instance from FIG. 27A.

FIG. 28B is the instant the hit is to take place. FIG. 28A occurs before FIG. 28B and FIG. 28C occurs after FIG. 28B.

FIG. 29A indicates long duration or high velocity.

FIG. 35 is a flow diagram showing the overall process by which the guidance system operates.

FIG. 36 is a flow diagram showing the process by which the Song Event Dispatch Processor operates.

FIG. 37 is a flow diagram showing the process by which the Render Processor operates.

FIG. 38A shows grouped indicators destined for a lower partial with a high velocity.

DETAILED DESCRIPTION

The system of the present invention comprises an electronic device with sensor inputs configured to act as a user interface and speaker output to produce sound responsive to the inputs.

Figure 1:
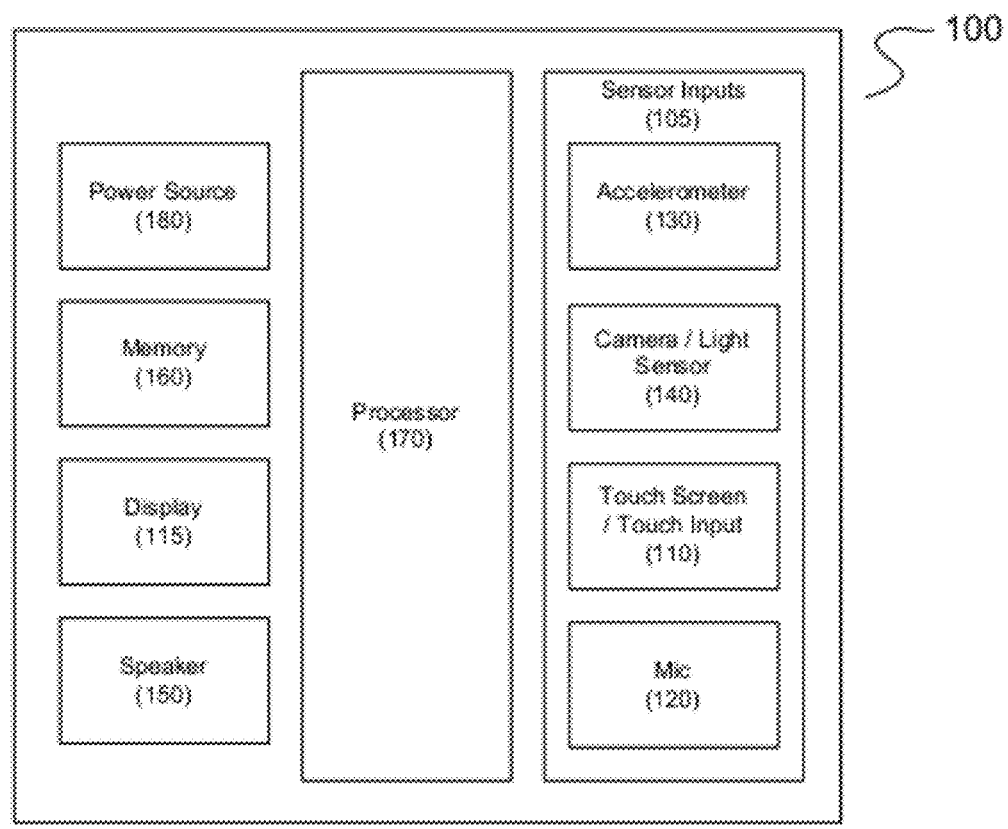
FIG. 1 is a block diagram of the device of one embodiment of the present invention.

FIG. 1 shows a block diagram of such a device 100. It has a set of sensor inputs 105 including, but not limited to:

(1) a touch screen 110 which can sense location and optionally force (or touch area),
(2) a microphone 120,
(3) a 1 to 3 axis accelerometer 130,
(4) a camera and/or light sensor 140.

It has a speaker 150 for outputting sound, one or more digital sound representations, a memory 160 for storing them, and a processor 170 for executing software capable of receiving configuration parameters, maintaining state, receiving sensor input data, processing the input data, and responding. The response is done in accordance with the configuration parameters, system state, and the input events. It involves controlling playback of audio through the speaker; sounds may be started and stopped and attributes such as tone, pitch, accent, nuance, volume, and vibrato may be varied. A power source powers the device 180, and display may be attached to the touch screen or separate 115.

Sound Representation

Figure 2:
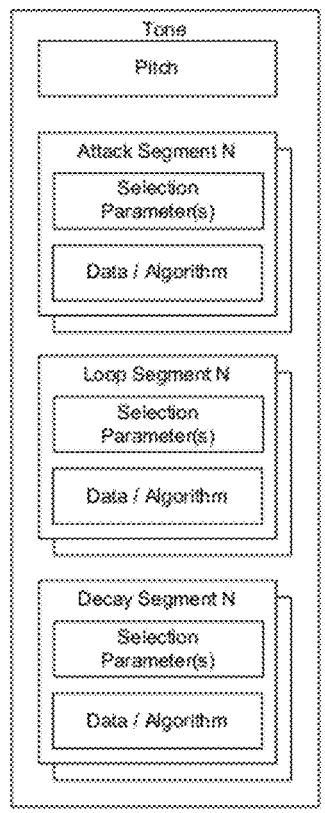
FIG. 2 is a diagram of the Tone data object model.

Audio to be output is represented digitally within a data object called a Tone. As shown in FIG. 2, a Tone comprises one or more digital representations, where the representation is either digital data or an equation or algorithm. The data files have an inherent pitch, which is later adjusted to produce alternative pitches. The data files may be split into different phases, including, for example, attack, loop, and decay. The attack segment is the beginning of a Tone, the loop segment is to be looped repeatedly as long as the note is intended to be sustained, and the decay segment is played once playback of the Tone is to be stopped. Alternatively to storing the phases in separate files, they may be stored in a single file and instead indicated by times from the start of the file.

One or more representations of the Tone which offer different musical nuance with the same inherent pitch may be contained within the Tone. For example, the Tone may consist of a set of attack, loop and decay files which have a strong accent and vibrato, and another set of which have a soft accent and a steady sustain. Parameters for selecting one set versus another are also stored within the Tone model and associated with each set. An example of such a parameter would be, "Volume> 0.5", which would indicate that the particular representation by played if the volume output is above 0.5.

In some embodiments, sound waveforms may also be generated by algorithmic and/or mathematical models, or some combination thereof. In this case, the algorithm or model is associated with the Tone. If no stored representations are used, the pitch may be set directly.

Event Processing and Output

Figure 3:
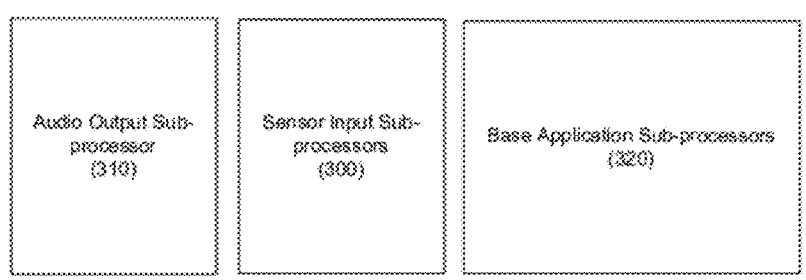
FIG. 3 is a block diagram of the system sub-processors.

As shown in FIG. 3, three classes of sub-processors are used to provide system functionality: one, the sensor event sub-processor 300, two, the audio output sub-processor 310, and three, the base application sub-processors 320. The base application sub-processors are for controlling system views, configurations, and interacting with models beyond what is performed by the two other classes of sub-processors.

Figures 4, 5:
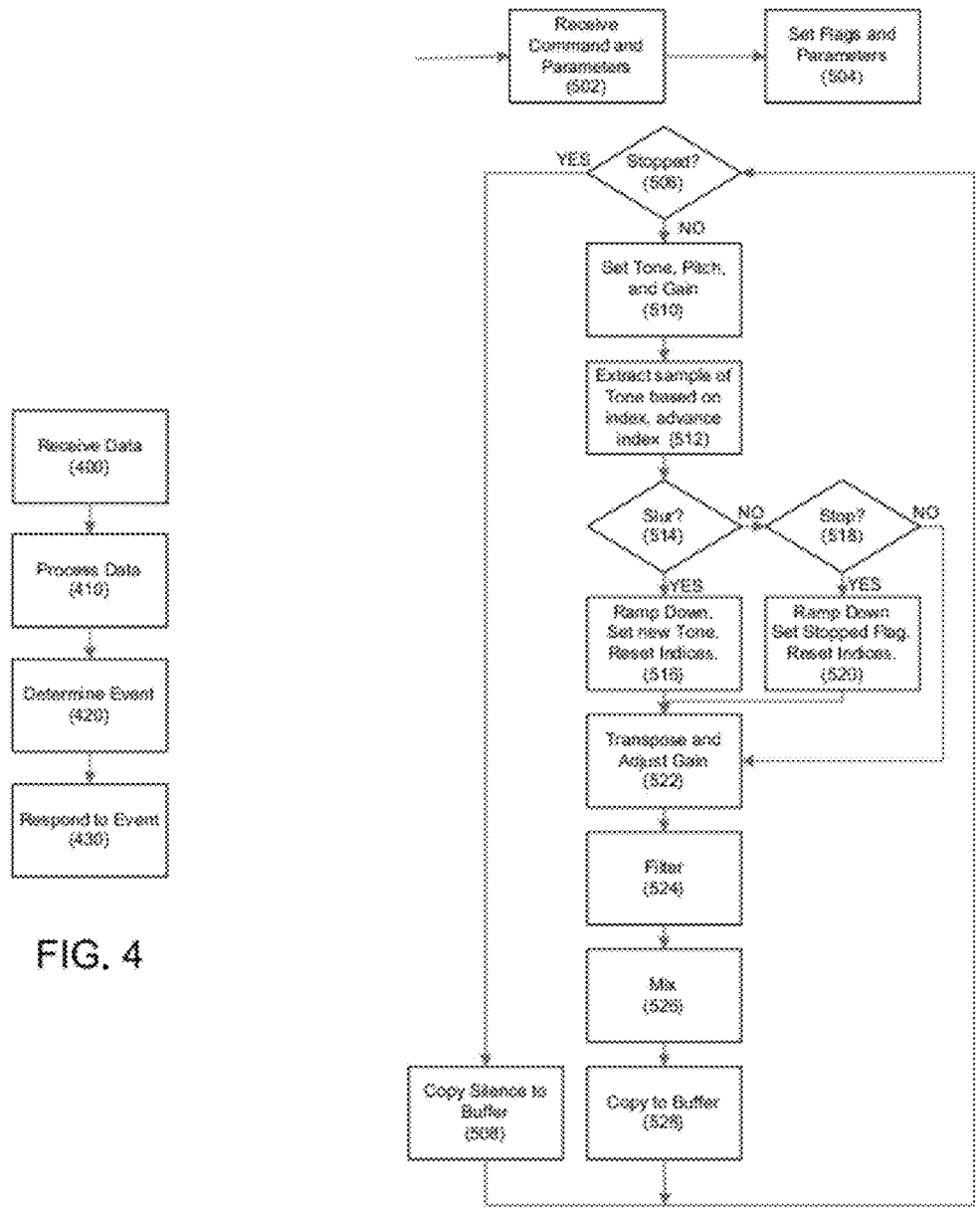
FIG. 4 is a flow diagram of the general steps performed periodically by the sensor input sub-processors.
FIG. 5 is a flow diagram of the general steps performed periodically by the audio output sub-processor, also referred to as the playback processor.

As shown in FIG. 4, sensor event sub-processors receive 400 sensor data, process 410 the data to determine 420 actionable events, and respond 430 to the events in accordance with configuration flags, and system state. The response consists of either sending (1) a command and parameters to the audio output sub-processor and/or setting (2) flags to be used by other sensor event sub-processors, which in turn send commands and parameters to the audio output sub-processor. The series of steps is executed repeatedly often at intervals less than 10 ms.

The audio output sub-processor is responsible for receiving and executing instructions on sound playback. FIG. 5 illustrates the overall process by which it operates. On receipt 502 of commands it sets 504 flags and parameters which are then acted on by a "callback" function which executes periodically at a rate determined by the audio sampling rate and audio buffer size. Assuming it is not stopped 506, in which case it played silence 508, it selects and sets 510 the appropriate Tone, type, pitch and volume. It then extracts 512 a segment of the appropriate data or waveform, prepares for stopping 518,520 or transitioning 514,516 to another note, transposes 522 the waveform and adjusts volume, filters 524, and finally copies the result to the audio output buffer for playback through the system speaker 528. If multiple simultaneous sounds are to be produced, the sounds are mixed 526 prior to copying to the buffer.

The process of FIG. 5 includes two processes for transitioning the sound to silence or another note. When transitioning 516 to silence, the sound is ramped down in volume to prevent clipping and indices tracking position with data or waveform algorithms are reset. When transitioning 520 to another note, the sound is prepared for transition to another note, as might be the case if the note were to be slurred to another note. In a simple embodiment, the sample is ramped down in volume, the indices reset, and the next note and its attributes are set for subsequent processing in the next iteration of the audio output sub-processor.

Methods of Triggering Sound and Setting Attributes

Sounds are triggered and their attributes set by the inputs, alone, or in combination. Inputs may require varying degrees of processing, for example accelerometer input can be filtered to determine angle change or vibration; mic input can be processed to determine level or pitch. Derivative methods may also be employed, for example, in the case of using touch as a trigger, duration between touch events may be used to determine whether a fast attack or a slow attack should be played. (Attack is often referred to as, or linked to note velocity).

Table 1 summarizes various methods by which sounds are triggered and attributes set.

TABLE 1

Methods by which sounds are triggered and controlled

| Attribute | Input(s) | Notes and Examples |
|---|---|---|
| Trigger | Touch | Begin = ON, End = OFF |
|  | Mic level | Above threshold = ON, below threshold = OFF |
|  | Accelerometer (shake) | Shake = ON, subsequent Shake = OFF |
|  | Accelerometer (angle) | Above angle = ON, Below angle = OFF |
|  | Camera/Light | Light = ON, Dark = OFF |
| Tone & Pitch | Touch location(s) |  |
|  | Mic pitch or level |  |
|  | Accelerometer (angle or shake) |  |
|  | Camera/Light |  |
|  | Touch location(s) + Accelerometer (angle or shake) | Angle controls partial, touch location represents pressing keys. Or, shake toggles octave. |
|  | Touch location(s) + Camera/Light | As Accelerometer shake, |
| Tone Type | Accelerometer (shake) | Shake = fast attack, no shake = regular attack |
|  | Based on Volume | Low volume = slow attack, High volume = fast attack |
|  | Based on duration between Touches | Short duration = quick attack, Long duration = slow attack |
|  | Touch force or area | High force = Fast attack, Low force = Slow attack |
| Volume | Accelerometer (angle) | High angle = High volume, Low angle = Low volume |
|  | Touch force or area | High force = high volume, Low force = low volume |
| Mode (i.e. tonguing) | Touch location(s) |  |
|  | Accelerometer (angle or shake) |  |

Several of these methods are illustrated by embodiments representing real instruments including a Trombone, a Trumpet, and a Saxophone.

Trombone

Figure 6:
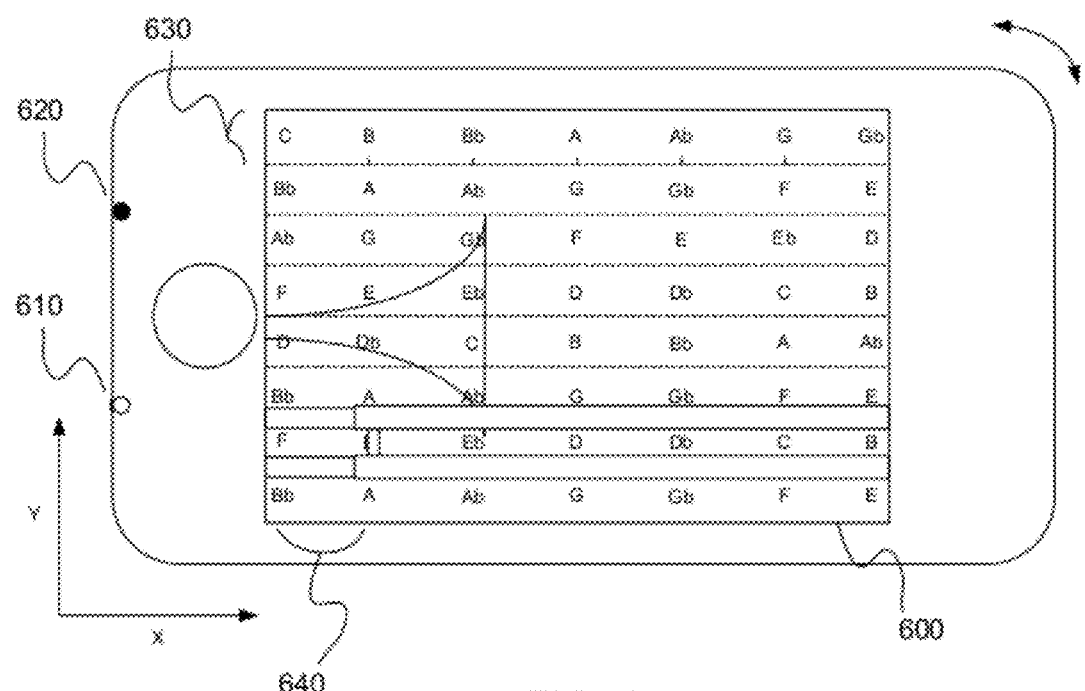
FIG. 6 is a diagram of present invention embodied as a Trombone.

FIG. 6 shows the present invention embodied as a Trombone. A real Trombone consists of a length of brass tubing with a mouthpiece connected at one end, and a flared bell at the other. It has a telescoping slide designed for modifying the effective length of the instrument and thus changing pitch. The slide has seven positions, each marking a semitone decrease in pitch from the $1^{st}$, fully closed position. Sound is generated when a person "buzzes" their lips into a mouthpiece, causing the column of air inside the tubing to vibrate. Pitch is determined by both the frequency of the "buzzing" and the position of the slide.

By tightening lips (embouchure) and "buzzing" at a higher frequency, users can increase the pitch to a higher partial in the overtone series. Quality, nuance and volume are determined largely by the embouchure, and air speed and direction.

As embodied by the present invention. The device has a touch display 600, a mic 610, and speaker 620, with additional sensors and processor electronics contained within the case.

The display is partitioned into 8 overtone partials 630 on the Y-axis, and 7 slide positions 640 along the X-axis. Sound is triggered when a user either blows into the mic, or touches the display. Pitch is determined by the location of the touch on the display. Volume is determined by mic level, force of touch (or area of touch) on the display, or angle of the device as determined by an accelerometer. Attack type, note quality and other nuance are determined by shaking the device, or may be linked directly to volume or duration of notes.

FIG. 7 shows a flow diagram of the process by which the processor handles touch events. Display sensor information is received 700 periodically, and processed to determine whether a touch has begun 702, moved 704, or ended 706. If a touch has begun, the tone and pitch adjustment are determined 708 based on location of the touch.

In determining the Tone and pitch, the partial is first determined from the location along the Y-axis. A base Tone (FIG. 2) comprising one or more attack, loop, and decay data files or waveforms is assigned to its corresponding partial in a designated slide position. Table 2 shows a sample of the relationship between Y-axis touch location, pitch in first position (slide closed), and assigned Tone.

TABLE 2

Sample association between Y-position, partial, base Tone and pitch

| Y-position [pixels] | $1^{st}$ Pos. Note | Assigned Tone | Adjustment Semitones |
|---|---|---|---|
| 7-8 * pixels/partial | C5 | Tone-Bb4 | 2 |
| 6-7 * pixels/partial | Bb4 | Tone-Bb4 | 0 |
| 5-6 * pixels/partial | Ab4 | Tone-Bb4 | -2 |
| 4-5 * pixels/partial | F4 | Tone-F3 | 0 |
| 3-4 * pixels/partial | D4 | Tone-F3 | -3 |
| 2-3 * pixels/partial | Bb3 | Tone-Bb3 | 0 |
| 1-2 * pixels/partial | F3 | Tone-Bb3 | -5 |
| 0-1 * pixels/partial | Bb2 | Tone-Bb2 | 0 |

Thus, for example, with a display 320 pixels high and 8 partials assigned, a touch at Y-position of 310 pixels would fall within the $8^{th}$ partial, and correspond to a base Tone of Bb4.

A pitch adjustment of the base Tone is then determined. First, the number of semitones variation due to slide extension is calculated from the X-axis touch location according to the following equation (we assume the slide is equal to the entire display width):

Slide semitones=$X$ position pixels*(6 semitones/Display width pixels)

This value is then added to a pre-configured number of adjustment semitones for the previously determined Tone. Sample adjustment semitone values are shown in Table 2.

Total semitones=Adjustment semitones+Slide semitones

The total semitones are then used to calculate the pitch adjustment by the following formula:

Pitch adjustment=2^(Total semitones/12)

Therefore, in this particular example, assuming display dimensions of 480 pixels wide by 320 pixels high, if the user touches location (200 pixels, 310 pixels), the touch falls within the $8^{th}$ partial which corresponds to the base Tone of Bb4 and has two Adjustment semitones. The final pitch adjustment is calculated as follows:

Slide semitones=200 pixels*(6 semitones/ 480 pixels)=2.5 semitones

Total semitones=2+2.5=4.5 semitones

Pitch adjustment=2^(4.5/12)=1.3

TABLE 3

Sample activation parameters for Attack and Loop types

Tone Bb3

| | | | | |
|---|---|---|---|---|
| Attack 1 | Vol. < 0.5 | Force > 0.5 | Shake < 0.5 | Time since last Tone < 1 sec |
| Attack 2 | Vol. >= 0.5 | Force >= 0.5 | Shake > 0.5 | Time since last Tone > 1 sec |
| Loop 1 | Vol. < 0.5 | Force > 0.5 | Shake < 0.5 | Time since last Tone < 1 sec |
| Loop 2 | Vol. >= 0.5 | Force >= 0.5 | Shake > 0.5 | Time since last Tone > 1 sec |

With the Tone selected, a sound type, if available may also be selected 710. For example, if the volume, force (or touch area), and/or shake is above a certain threshold, a different attack type may be selected. Table 3 shows sample activation parameters for selecting different attack and loop types. Note that the volume may be determined from force (or area) of touch or from one of the additional sensor inputs, such as mic level, or accelerometer angle. In this case, a delay may be added to ensure that the external event is determined and flag set prior to determining the type. Attack type may also be determined from the duration between successive touches; if short, then a faster attack is used, whereas if long, a slower attack is used. In order to calculate the duration between successive touches the time of last touch must be stored and then later subtracted from the time of current touch.

With qualities of the note determined, the Tone, its type, and pitch adjustment are sent 712 to the playback processor. If 714 configured to trigger sound by touch, the playback command is sent 716 to the playback processor.

If 704 a touch is determined to have moved, a similar process is followed. The Tone and pitch adjustment are determined 718, as previously described; however, if the partial has changed from the previous partial, such as if a player was moving from a Bb up one partial to a D, a "slur" can be assumed, and the playback processor is sent 720 a slur request with the new Tone and pitch adjustment. Otherwise, if the movement has occurred within a partial, the new pitch is requested 720 of the playback processor such that it can continue to use the same base Tone but adjust the pitch.

Finally, if 706 a touch is determined to have ended, and the system is configured to trigger by touch 722, a stop is requested 724 of the playback processor. A decay phase may also be employed. In this case, the playback processor will playback a decay segment before ramping down and stopping playback. In a modified embodiment, the type of decay phase may first be determined (for example, fast vs. slow), and then sent to the playback processor along with the request for stop.

FIG. 8 shows a flow diagram of the process by which the mic sensor handles events assuming it has been selected by the user to trigger sound playback. The raw mic data is received 800 periodically and peak and average levels are determined 802 by a callback and/or timer function. If 804 the player is currently not playing and 806 the average volume level is above a particular threshold, a start request is sent 808 to the playback processor, with the Tone and pitch having separately been requested by the Touch event processor. If 804 the player is currently playing and 810 the average volume level is above the threshold, it should continue playing and a volume adjustment based on the average volume level is requested 812 of the playback processor. Finally, if 804 the player is currently playing, but 810 the average volume level is below the threshold, a stop is requested 814 of the playback processor. In another embodiment, toggling sound is controlled by touch, whereas volume can be controlled by mic.

Figure 10:
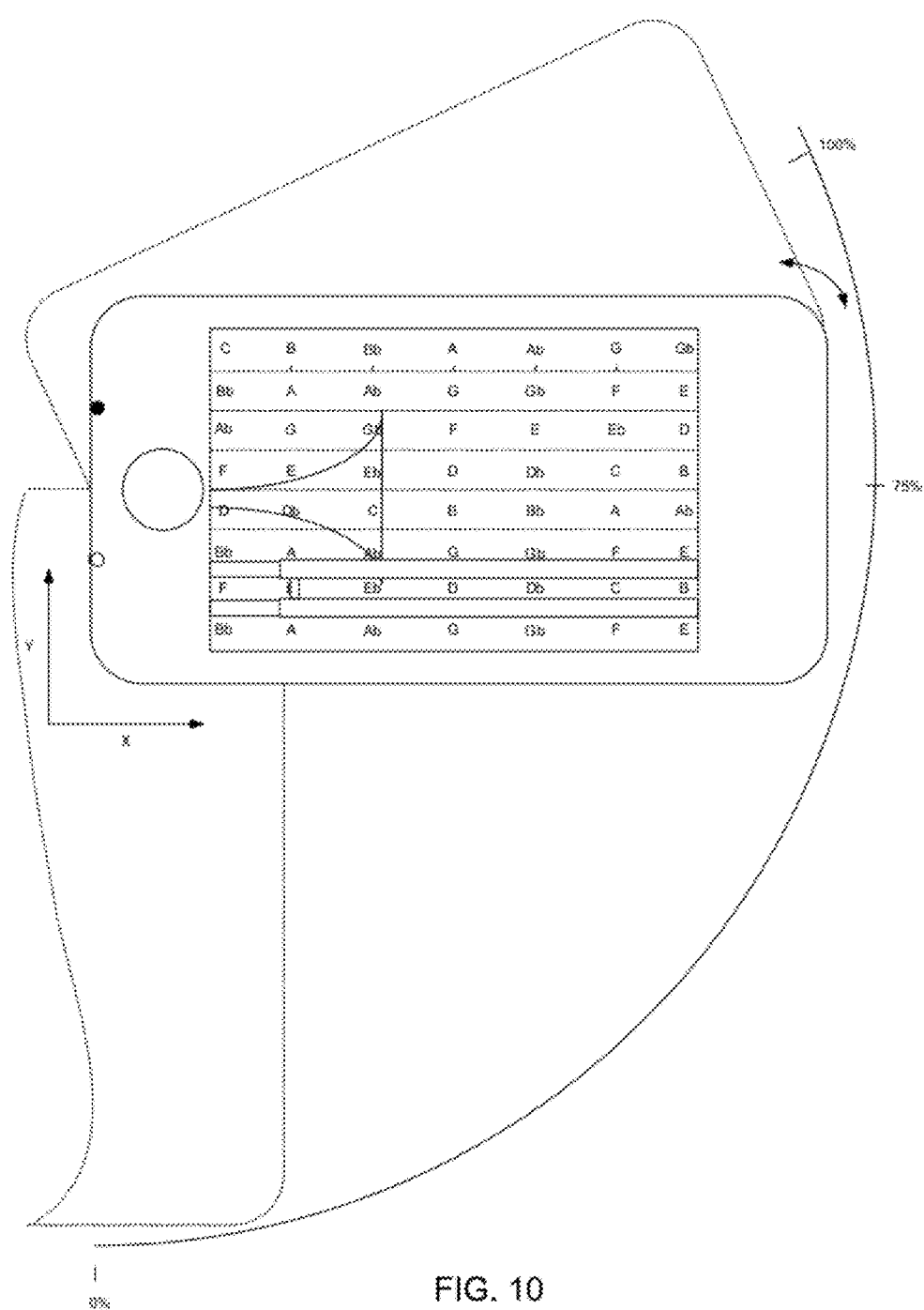
FIG. 10 is a diagram showing the embodiment of FIG. 6 configured to control volume by rotation in the XY plane.

FIG. 9 shows a flow diagram of the process by which the accelerometer sub-processor handles events. The raw data is received 900 and filtered 902, 904 to determine an actionable event. In this particular embodiment the event is either a low frequency event, such as an n angle change, or a high-frequency event, such as a shake. As shown in FIG. 10 the X-Y angle of the device is configured to correspond to a volume adjustment. At an angle of approximately 30 degrees, the invention produces maximum volume, where as, at −90 degrees it produces 0 volume. It varies linearly in this range. Referring again to FIG. 9, the X-Y angle is determined 906 and the volume adjustment is then determined. The volume adjustment is then sent 908 to the playback processor.

If 904 a shake event is detected, a flag that the event occurred and the time at which it occurred is set 910, such that any of the event processors responsible for starting playback may refer to it to determine attack type. In a modified embodiment, the shake could be configured to start and stop the sound playback, as well. In yet another embodiment, the shake could be configured to request a special playback mode of the playback processor, such as a rapid fire tonguing mode where the notes are started and stopped rapidly rather than sustained.

Trumpet

Figure 11:
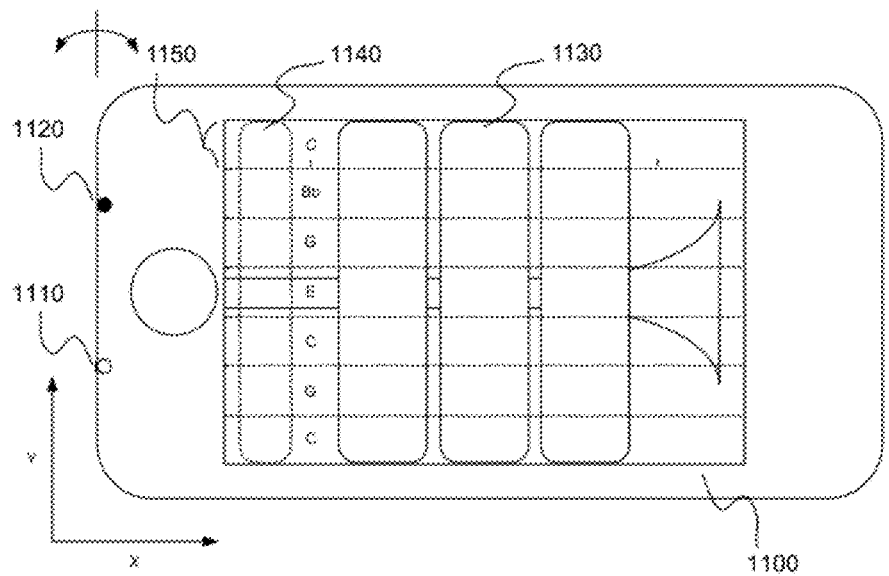
FIGS. 11-14 are diagrams of the present invention embodied as a Trumpet.

FIG. 11 shows the present invention embodied as a Trumpet. A real Trumpet consists of a length of brass tubing with a mouthpiece connected at one end, and a flared bell at the other. It has a set of three valves which when open and closed modify the effective length of the instrument and thus change pitch. As with the Trombone, sound is generated when a person "buzzes" their lips into a mouthpiece, causing the column of air inside the tubing to vibrate. Pitch is determined both by opening and closing the valves and changing the frequency of the "buzzing".

The valves are numbered 1 through 3, starting with the valve closest to the mouthpiece. The first valve decreases the pitch by 2 semitones, the second by a semitone, and the third by 3 semitones. Simultaneously, by tightening lips (embouchure) and "buzzing" at a higher frequency, users can increase the pitch to a higher partial in the overtone series. Quality, nuance and volume are determined largely by the embouchure, and air speed and direction.

As embodied by the present invention. The device has a touch display 1100, a mic 1110, and speaker 1120, with additional sensors and processor electronics contained within the case.

Various embodiments are presented. One set of embodiments determines Tone and pitch by touch exclusively, whereas another set of embodiments determines Tone and pitch by a combination of touch location and device rotation.

Figure 12:
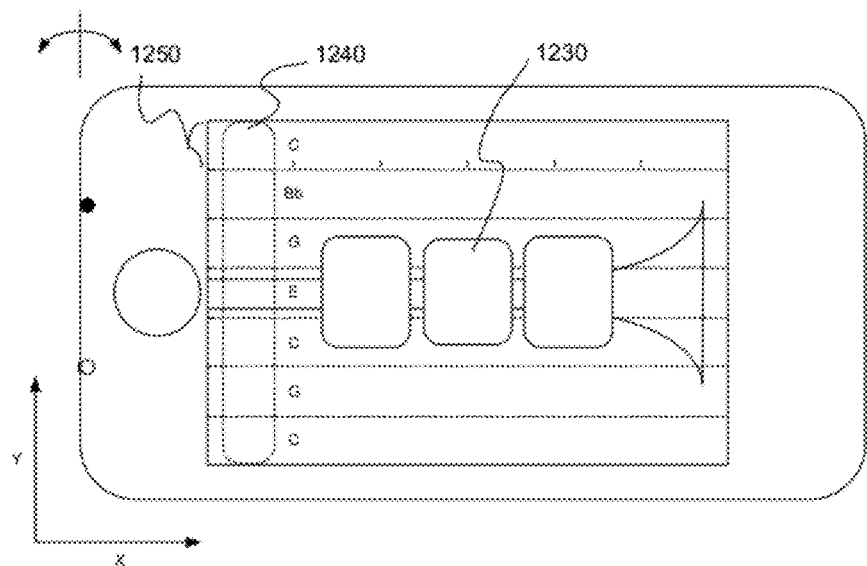

FIGS. 11 and 12 show embodiments where Tone and pitch are determined by touch exclusively. In the embodiment of FIG. 11, three areas 1130 on the display are defined, each representing a valve. An additional area 1140 is defined which represents all open valves.

In FIG. 11, the three valve areas 1130 and open valve area 1140 stretch across the height of the display, spanning 7 overtone partials 1150, such that touching a combination of keys at a particular partial level will generate a tone with that particular pitch.

In a variant of FIG. 11, there is no open valve area. The open valve state is signaled by a quick tap, rather than a sustained touch in a partial area.

In FIG. 12, the three valve areas 1230 do not correspond to a particular partial 1250. The partial is rather determined by a touch at a particular partial in the open valve area.

Figure 13A:
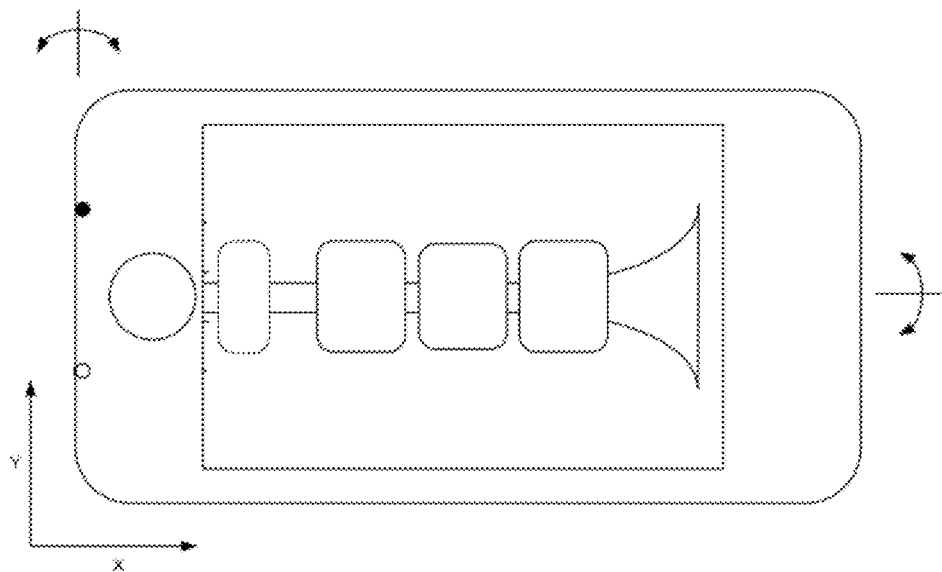
Figure 13B:
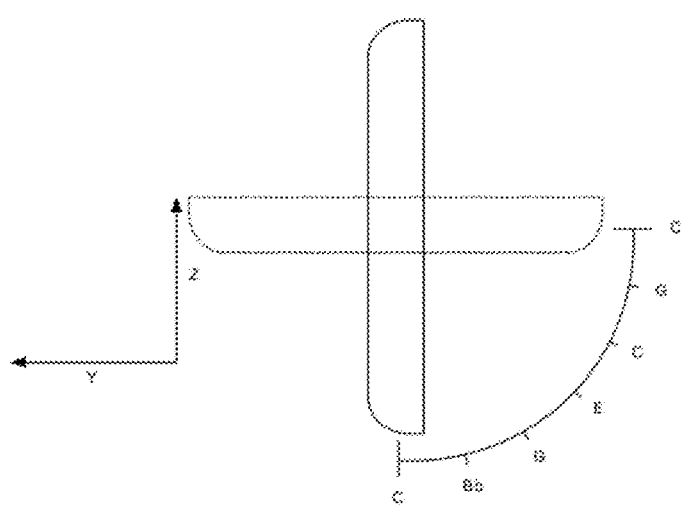
Figure 14A:
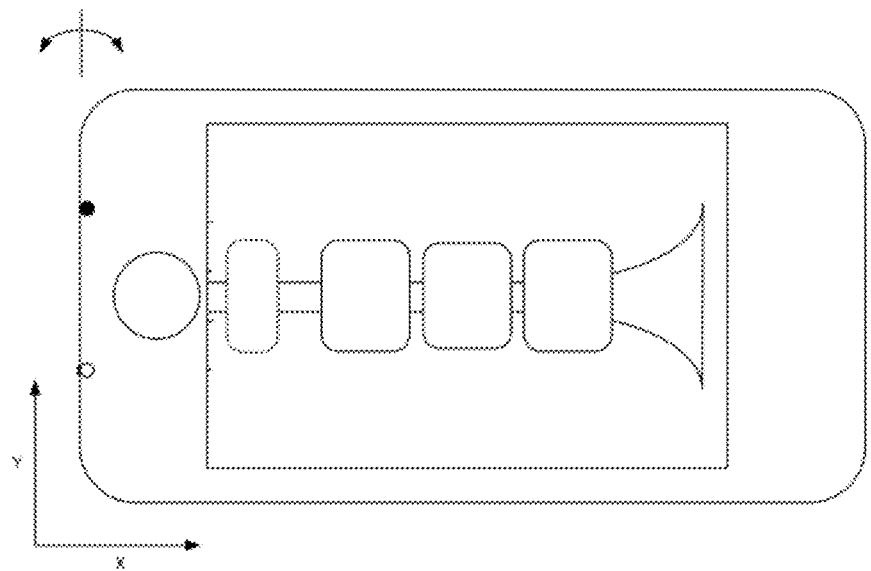
Figure 14B:
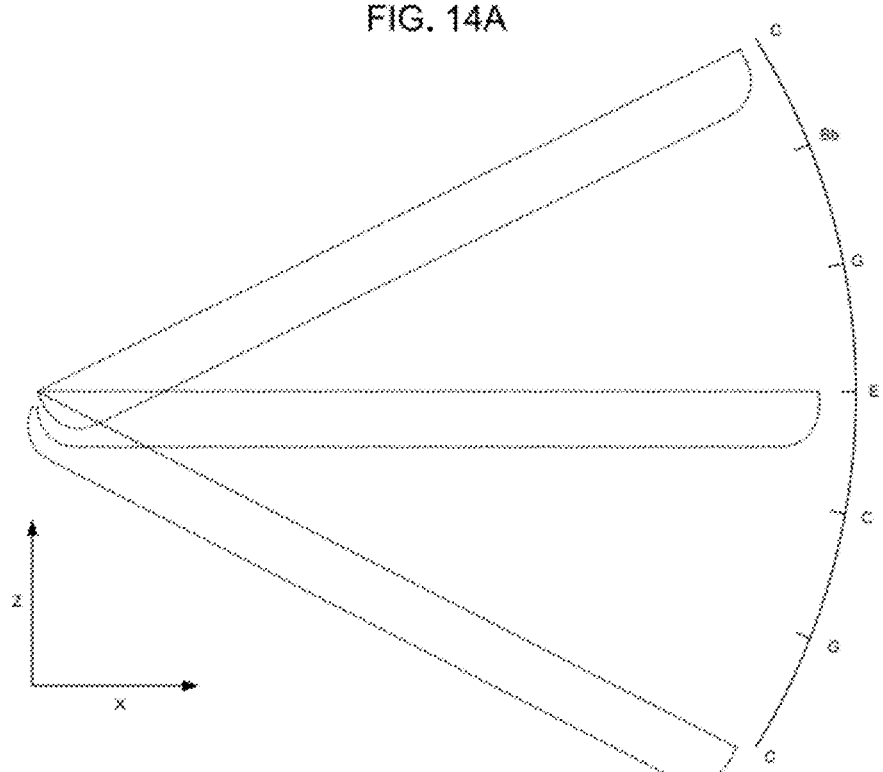

FIGS. 13A and 14A show embodiments where Tone and pitch are determined by a combination of touch location and rotation of the device. The angle of rotation is used to set the partial. In FIGS. 13A and 13B the partial is set by rotating about the X axis, whereas in FIGS. 14A and 14B, the partial is set by rotating about the Y axis.

In each of the embodiments, the sound may be triggered by various methods including, but not limited to touch, and mic levels. If mic levels are used, the open valve area is not required for embodiments of FIGS. 13 and 14 which use touch and rotation to determine pitch.

FIG. 15 shows the flow of the process by which the Trumpet embodiments handle touch events.

Display sensor information is received 1500 periodically, and processed to determine whether a touch as begun 1502, moved 1504, or ended 1506. If a touch has begun, the Tone and pitch adjustment are determined 1508 through one of several methods depending on embodiment In embodiments of FIGS. 11 and 12, Tone and pitch are determined exclusively by touch. Areas of the display are assigned to key valves or open valves. If a touch location lies within one of these regions it is considered to be pressed. As with the previously described Trombone embodiment, the partial is first determined from the touch location along the Y-axis. A base Tone and its associated Adjustment Semitones are determined from the partial. Table 4 shows sample associations between Y-position, partial, base Tone, and adjustment semitones.

TABLE 4

Sample association between Y-position, partial, base Tone and pitch

| Y-position [pixels] | Open Valve | Assigned Tone | Adjustment Semitones |
|---|---|---|---|
| 6-7 * pixels/partial | C5 | Tone-Bb4 | 2 |
| 5-6 * pixels/partial | Bb4 | Tone-Bb4 | 0 |
| 4-5 * pixels/partial | G4 | Tone-Bb4 | −3 |
| 3-4 * pixels/partial | E4 | Tone-Bb4 | −6 |
| 2-3 * pixels/partial | C4 | Tone-C4 | 0 |
| 1-2 * pixels/partial | G3 | Tone-C4 | −6 |
| 0-1 * pixels/partial | C3 | Tone-C3 | 0 |

The semitone adjustment due to the valve presses is then determined. $1^{st}$ valve closed, $2^{nd}$ valve closed, and $3^{rd}$ valve closed cause 2, 1, and 3 semitone decreases, respectively. The semitone decrease is additive, such that if $1^{st}$ and $2^{nd}$ valves are closed, there is a 3 semitone decrease; likewise, if $1^{st}$ and $3^{rd}$ valves are closed, there is a 5 semitone decrease.

With the valve semitones determined, the total semitone adjustment from base Tone pitch can be determined.

Total semitones=Adjustment semitones+Valve semitones

The total semitones are then used to calculate the pitch adjustment by the following formula:

Pitch adjustment=2^(Total semitones/12)

A similar procedure is followed for the embodiments of FIGS. 13 and 14; however, the partial is determined not be touch location along the Y-axis, but by rotation. In the case of FIG. 13, rotation is within the YZ plane. And in the case of FIG. 14, rotation is within the XZ plane.

When the touch event is received, the device angle is determined from the accelerometer data, and matched to find the associated partial, base Tone, and adjustment semitones. Table 5 shows an example of the association.

TABLE 5

Sample association between YZ angle, partial, base Tone and pitch

| YZ angle [degree] | Open Valve | Assigned Tone | Adjustment Semitones |
|---|---|---|---|
| 82.5-97.5 | C5 | Tone-Bb4 | 2 |
| 67.5-82.5 | Bb4 | Tone-Bb4 | 0 |
| 52.5-67.5 | G4 | Tone-Bb4 | −3 |
| 37.5-52.5 | E4 | Tone-Bb4 | −6 |
| 22.5-37.5 | C4 | Tone-C4 | 0 |
| 7.5-22.5 | G3 | Tone-C4 | −6 |
| −7.5-7.5 | C3 | Tone-C3 | 0 |

Determination of the pitch adjustment proceeds as described for the other embodiments. In order to ensure that the angle is determined prior to partial being determined, a slight delay may be inserted.

With Tone and pitch determined, the type of attack or other quality of Tone is found 1510 as described in the Trombone embodiment. Finally, with Tone, pitch adjustment, and other Tone quality determined, the parameters are sent 1512 to the playback processor, and if 1514 set to trigger playback by touch, playback is requested 1516.

A similar process is followed if a touch moved event is received 1504. A new Tone, pitch adjustment, and note quality are determined 1518. If the Tone or partial changes a slur may be signaled 1520 to the playback processor along with the other Tone parameters.

Finally, if a touch end event is received, and 1522 the system is configured to trigger playback by touch, a playback stop is requested 1524 of the playback processor.

As in the previously described Trombone embodiment, FIG. 16 shows a flow diagram of the process by which the mic sensor handles events if it has been selected by the user to trigger sound playback. The raw mic data is received 1600 periodically and peak and average levels are determined 1602 by a callback and/or timer function. If 1604 the player is currently not playing and 1606 the average volume level is above a particular threshold, a start request is sent 1608 to the playback processor, with the Tone and pitch having separately been requested by the Touch event processor. If 1604 the player is currently playing and 1610 the average volume level is above the threshold, it should continue playing and a volume adjustment based on the average volume level is requested 1612 of the playback processor. Finally, if 1604 the player is currently playing, but 1610 the average volume level is below the threshold, a stop is requested 1614 of the playback processor. In another embodiment, toggling sound is controlled by touch, whereas volume can be controlled by mic. In yet another embodiment, mic input can be used to determine partial. A Fourier transform is done on the mic input to determine its pitch. It is then matched to the set of partial pitches to select the closest partial.

FIG. 17 shows a flow diagram of the process by which the accelerometer handles events. The raw data is received 1700 and filtered 1702-1706 to determine an actionable event. In this particular embodiment the event is either an angle change, or a shake. The angle change may correspond either to a change in volume, or a change in partial, as would be the case with the embodiments of FIGS. 13 and 14. If 1702 the angle change occurs about an axis configured to correspond to a partial, the angle itself is stored 1712 for later query by the touch event processor, or the partial is determined 1710 as described previously and in accordance with FIGS. 13 and 14, and stored 1712 for later reference by the touch event processor.

If 1704 the angle change occurs about an axis configured to correspond to volume, the volume can be determined 1714 as previously described in accordance with FIG for the Trombone embodiment. With volume determined, it is sent 1716 to the playback processor.

If 1706 a shake event is detected, a flag that the event occurred and the time at which it occurred is set 1718, such that any of the event processors responsible for starting playback may refer to it to determine attack type. In a modified embodiment, the shake could be configured to start and stop the sound playback, as well.

Saxophone

Figure 18A:
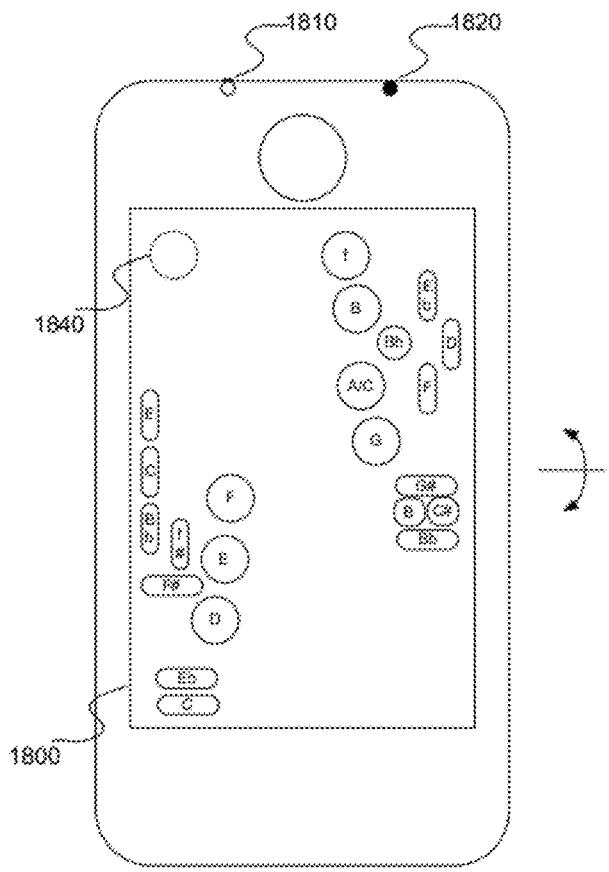
FIG. 18A is the front of the device.
Figure 18B:
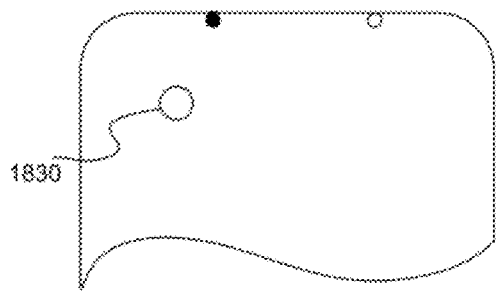
FIG. 18B is the back of the device.

FIG. 18 shows the present invention embodied as a Saxophone. A real Saxophone consists of a length of brass tubing with a mouthpiece connected at one end, and a flared bell at the other. It has a series of holes which are covered and uncovered by pads which are controlled by pressing a series of keys. Keys are pressed by both left and right hands, including the left and, sometimes, right thumbs. Sound is generated when a person blows into the mouthpiece and vibrates the reed. Pitch is determined by wind and reed vibration and the combination of keys pressed.

By changing the oral cavity users can "lip up" to higher partials to play altissimo notes. However, they can reach many notes by the standard keys, which include the octave key. Quality, nuance and volume are determined largely by the shape of the oral cavity, lip position, wind speed and direction.

As embodied by the present invention. The device has a touch display 1800, a mic 1810, and speaker 1820, with additional sensors and processor electronics contained within the case.

Areas for each key are defined on the display. There are the left hand main keys (B, A/C, G, front F, and Bb), palm keys (D, Eb, F), and little finger keys (G#, Low C#, Low B, Low Bb). There are also right hand main keys (F, E, D, F#), side keys (E, C, Bb, High F#), and little finger keys (Low Eb, Low C). A thumb key for changing octave may also be located on the display, or an alternate input may be used, such as the camera 1840 located on the back of the device. If sound is to be triggered by touch, an open key area is also defined to indicate that no keys are pressed, but sound is to be played. Base Tone and pitch are determined by location of touches in these regions. As with other embodiments, volume is determined by mic level, force (or area) of touch on the display, or angle of the device as determined by an accelerometer. Attack type, note quality and other nuance are determined by shaking the device, or may be linked directly to volume, or duration of notes.

FIG. 20 shows a flow diagram of the process by which the processor handles touch events. Display sensor information is received 2000 periodically, and processed to determine whether a touch has begun 2002, moved 2004, or ended 2006.

If 2000 a touch has begun, the Tone and pitch adjustment are determined 2008 based on location of the touch.

Similarly to the other previously described embodiments, partial or level is first determined, followed by adjustment due to key presses. The Saxophone differs from the Trumpet embodiments in that there is less reliance on partial shift, and more on key press shift. With the standard key arrangement (including thumb octave key) the instrument is capable of two and a half octaves. Altissimo registers can also be reached extending the range to 3 or even 4 octaves.

Figure 19:
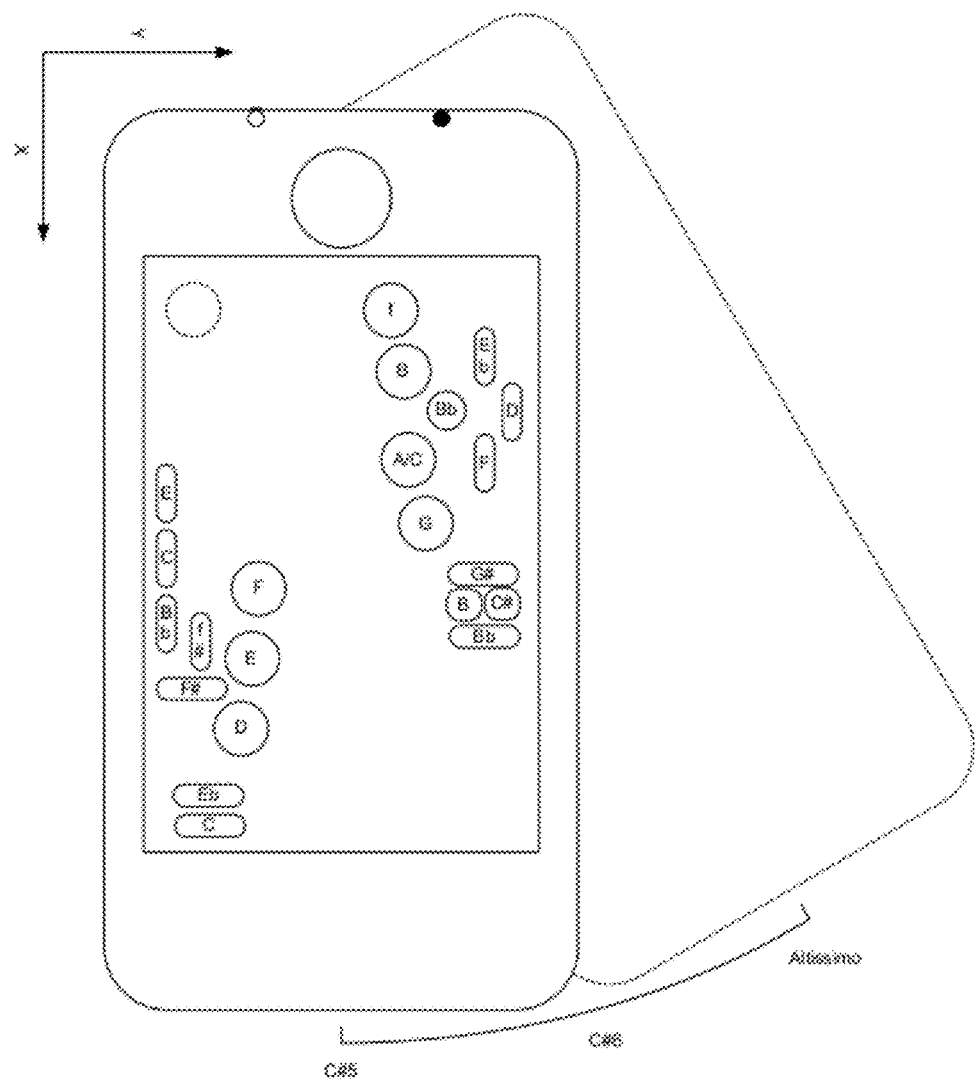
FIG. 19 is a diagram of the embodiment of FIG. 18 configured to set octave and/or partial by rotation in the XY plane.

Partial, or octave shift, can be set through various methods. In one embodiment (FIG. 18B) the camera 1830 is used as a thumb octave key. In another embodiment, the device can be rotated in the XY plane, as shown in FIG. 19 to raise the octave and enter altissimo registers. To each partial, octave or level, a base Tone with corresponding adjustment semitones is assigned.

Locations of the touches are then used to determine key presses. As with the other embodiments, the semitone shift due to key presses is then added to the base Tone adjustment semitones to determine the final pitch shift of the base Tone.

Attack type and other qualities of the note is then determined 2010. With Tone, pitch adjustment, note quality and any other parameters determined, they are sent 1512 to the playback processor. If 2014 configured to trigger playback by touch, playback is also requested 2016.

A similar process is followed if 2004 a touch moved event is received. A new Tone, pitch adjustment, and note quality are determined 2018. If the note changes a slur may be signaled 2020 to the playback processor along with the other Tone parameters.

Finally, if 2006 a touch end event is received and 2022 playback is configured to be triggered by touch, a playback stop is requested 2024 of the playback processor.

FIGS. 21 and 22 show the process by which mic events and accelerometer events are handled, respectively. These processes proceed similarly to those of the previously described Trumpet embodiments.

FIG. 23 shows the process by which camera input is handled to set the octave shift. The data is received 2300 periodically, processed 2302 to determine whether light is on or off, and the octave shift flag is set 2304 accordingly.

Guiding User Interaction

An additional invention is a system and method for guiding a user toward or suggesting a particular input action at a particular time. One preferred embodiment is a learning system for an electronic musical instrument, such as those previously described. A second preferred embodiment is for a musical gaming system.

Preferred embodiments include the aforementioned electronic trombone, trumpet, and saxophone. Additional embodiments include an electronic guitar, piano, drums, tambourine and other systems or devices requiring user input at a particular time. The user inputs may include touch, both single and multiple, shaking, sound, and those additional input methods previously described many of which are summarized in Table 1.

Figure 24:
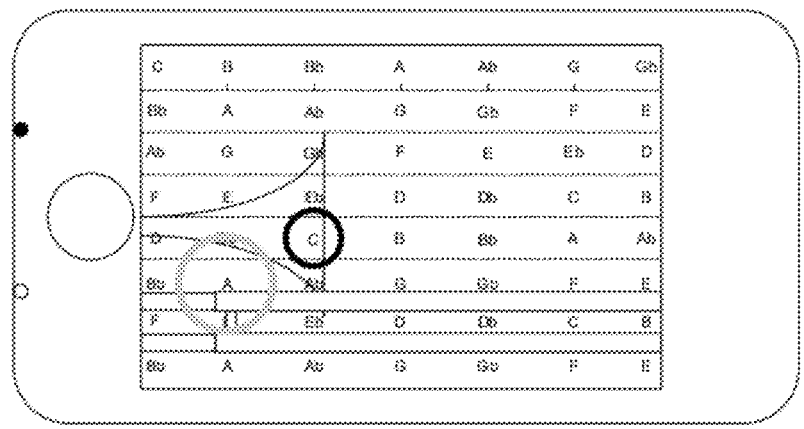
FIG. 24 is a diagram showing an instance during the execution of the present invention for guiding a user.
Figure 25:
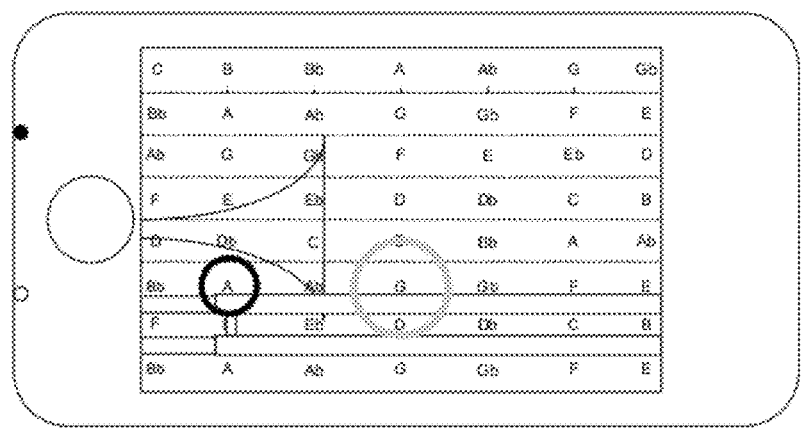
FIG. 25 is a diagram showing a later instance of that represented by FIG. 24.

FIG. 24 shows an example where indicators are displayed which suggest to a user how they should interact with the device. At the instant shown in FIG. 24, the user is to be pressing the middle C area, and preparing to press the A area below and to the left. FIG. 25 shows the sample example at a later time. The user is now to be pressing the A area and preparing to press in the G area. The types of indicators and methods by which they are displayed are described in more detail.

FIG. 26 illustrates various indicators that indicate input suggested of the user. These indicators are presented to the user on a display at the time the action is to take place. FIGS. 26A-C show indicators for touch. FIG. 26D shows indicator for shake. FIG. 26E shows an indicator which may be used to indicate direction of tilt or motion. FIG. 26F shows an indicator which may be used to indicate blowing in the microphone. Indicators may be comprised of different shapes, sizes, colors, transparency and other effects.

Various phases for a suggested action may exist. For example, if a note is to be played, there may be a preparatory phase where the user is provided visual cue to prepare them for hitting a note, a hit phase where the attack of the note is to occur, a sustain phase where the note is held, and a release phase where the note is released. Additional phases appropriate to the embodiment may also exist.

In these phases, the indicator is transformed by altering various attributes. The attributes include shape, size, position, colors, effects (for example, glow and shadow) and so on.

FIG. 27A shows a preparatory phase suitable indicating a touch at a particular position. The indicator starts with a large diameter and high transparency. As the elapsed time nears the time at which the action is to take place, the indicator decreases in diameter and transparency, resulting in the indicator of FIG. 27B.

Figures 28A, 28B, 28C:
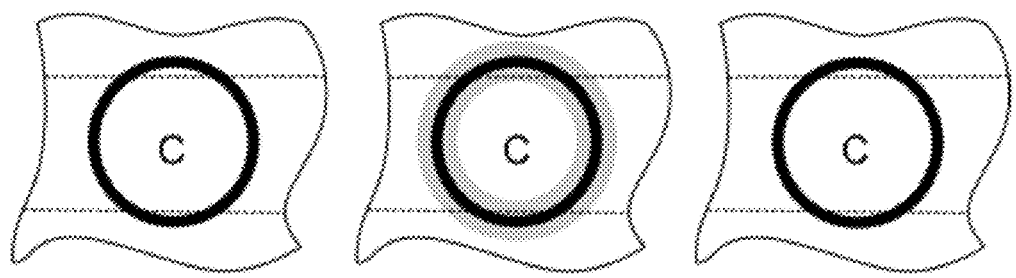
FIGS. 28A-C is a diagram showing the variation of an indicator during the hit phase where a user is guided to press the C note area.

FIGS. 28A-C shows a hit phase where immediately prior to the hit (FIG. 28A), a glow begins, reaches its height at the hit (FIG. 28B), and decreases returning to its original form (FIG. 28C) immediately thereafter.

Figures 29A, 29B:
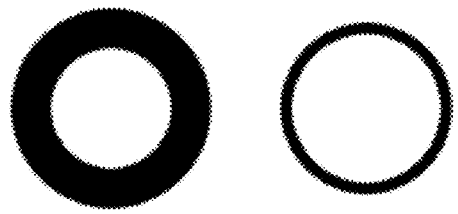
FIGS. 29A,B is a diagram showing how the indicator can describe attributes such as during or velocity.
FIG. 29B indicates short duration or low velocity.

Beyond indicating the type of action, Indicators may also indicate other properties of a suggested action, such as the duration the note is to be held, or perhaps the amount of force necessary in the attack. For example, FIG. 29A indicates a note with a long duration or hard attack, whereas FIG. 29B indicates with a short duration or soft attack.

Some embodiments may require multiple user inputs simultaneously, where either multiple notes are to be played at the same time, or multiple keys are to be pressed to play a single note, such as with an electronic trumpet or sax. For such embodiments, the indicators may be grouped and presented simultaneously throughout the various phases.

Figure 30:
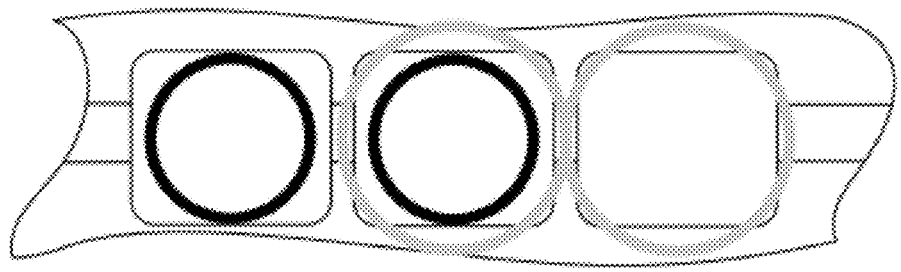
FIG. 30 is a diagram showing how multiple indicators can be used to guide a user towards simultaneous actions.

This is a consideration when considering the data model for representing the Indicators in software program code. FIG. 30 illustrates a case where at the present instant the first two valves are to be pressed whereas in the near future the second two valves are to be pressed.

The described features are implemented by both the electronic hardware and software and data stored and executable on the hardware. FIG. 1 illustrates the architecture of the hardware of such a system.

The software consists of two main processors. A song event dispatch processor and a render processor. The dispatch processor reads a set of instructions such as a digital score, and requests actions of the render processor which renders the visual and audible cues.

In the case of the musical instrument or musical game embodiments, the set of instructions is a digital score. Regardless of format type, the set of instructions indicates the time of the suggested action, the action, and its associated parameters. Duration of the action must be derivable from the instructions or explicitly stated.

In the case of music, timing of hit, sustain, release and other phases after the hit are defined by the notated music. Phases prior to the hit, such as the preparation phase must be set, either to a specific duration of time such as 1 second, or to a particular number of beats, such as 1 or 2 beats. The beats are then related to time by the tempo.

Figures 31, 32:
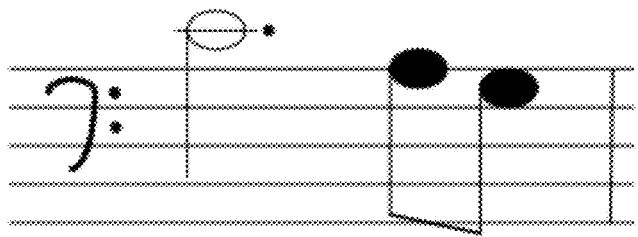
FIG. 31 is a diagram showing standard musical notation of a musical phrase.
FIG. 32 is a diagram showing MIDI notation of the musical phrase of FIG. 31

An example of a format for such a digital score is MIDI. FIG. 31 illustrates the standard musical notation. FIG. 32 illustrates the MIDI notation of the same musical phrase. The unit of time is a tick, and it is related to time is seconds by the key signature and tempo. A header specifies the number of ticks per quarter note, in this case 480. The key signature specifies the number of quarter notes per beat (1), and the tempo specifies the number of microseconds per beat (500000). Actions include play (Note_on) and stop (Note_off). Parameters of the actions include the note (60 corresponds to middle C), and attributes such as attack velocity (0-127, 127 being high). Duration of a particular note is determined by subtracting the play time from the stop time. Instructions for additional actions and effects, such as pitch bending, tonguing, or slurring may also be provided. The set of instructions may be kept in MIDI format and read directly by the dispatch processor or stored in an alternative representation suitable for reading by the dispatch processor.

Figure 33:
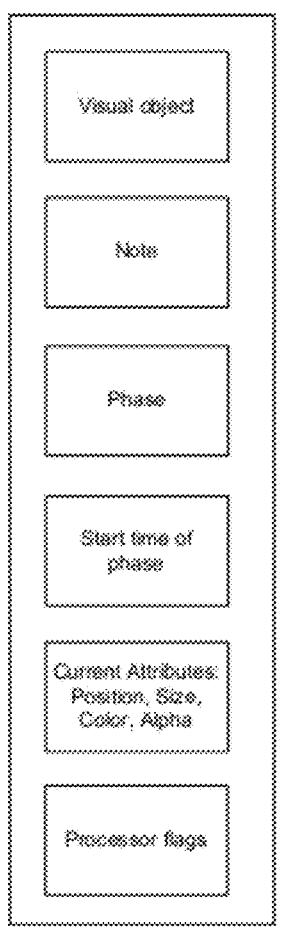
FIG. 33 is a block diagram showing the data model associated with an Indicator.
Figure 34A:
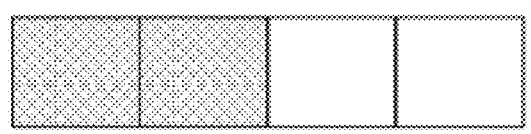
FIGS. 34A,B are block diagrams showing an example Active Indicator Array.
Figure 34B:
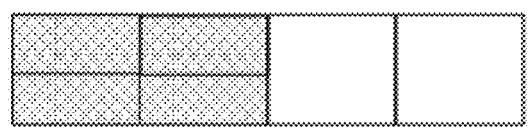
FIG. 34B shows Grouped Indicators in the first two cells of the array.

Before describing the process by which suggested actions are interpreted and rendered, it is useful to understand the data model which describes the Indicators. FIG. 33 shows a sample data model of an Indicator. It stores the note, the current phase, the start time of the phase, a reference to the visual object, attributes of the object, and processing flags, one of which includes a flag indicating whether or not the Indicator phase processing has begun. Those Indicators that are currently being processed are called Active Indicators and they are stored in an Active Indicator Array. FIG. 34A shows a sample Active Indicator Array. Newly created Indicators are added to the end, whereas finished indicators are removed from the front. Indicators may also be grouped in the case where multiple actions are required for a single outcome, such as pressing multiple keys to create a single note in a sax or trumpet. FIG. 34B shows an Active Indicator Array where the first objects are Grouped Indicators. Alternatively, they may be stored separately and merely processed rapidly in sequence.

FIG. 35 shows the overall steps. An initial configuration step involves processing and acquiring a set of instructions or digital score from some source which may include a remote server or a file stored in memory. An additional configuration step involves setting or determining a preparation time duration for any preparation phase, as this may not be included in the score. With configuration steps complete, the overall process can continue. The processes are achieved by the aforementioned song event dispatch processor, and the animation or render processor. The user may initiate the processing and separately end the processing.

FIG. 36 shows the steps by which the dispatch processor operates. When the processor is initiated it stores its start time. The processor then executes periodically, for example 60 times per second. It checks the set of instructions for events that need to be prepared. These events are those where the elapsed time is greater than or equal to the instructed time of the event minus the previously set preparation time. If an event is to be processed, its requested action is determined and processed accordingly. In the case of a play action, an Indicator is generated and stored in the Active Indicator Array along with any requested parameters, such as velocity. In the case of a stop action, a stop request flag associated with the active Indicator or Indicators is set. The indicators are then processed by the render processor.

FIG. 37 shows the steps by which the render processor operates. The render processor also operates periodically, perhaps 30 to 60 times a second. It processes each of the Indicators or Indicator groups stored in the Active Indicator Array. If the time since the action request is less than the length of the phase, the next step in the transformation is calculated and results are recorded and rendered. As previously mentioned, the transformation may include variation in position, shape, size, color, transparency and other effects. If the time since the action request is greater than or equal to the length of the phase or a stop has been requested, the next phase in a predetermined list of phases is set. For example, if the preparatory phase has elapsed, the next phase is the hit phase. If the hit phase has elapsed, the next phase is the sustain phase. If a stop has been requested, the Indicator is cleared and removed from the Active Indicator Array. Otherwise, the new phase is commenced by determining the first transformation and then recording and rendering the result.

The processors are stopped either when the user initiates a stop action or all events have completed.

In an additional embodiment, the user actual interaction is checked against the requested action and scored. These can be useful for either a learning system or a game.

One such learning system or game may run the set of instructions repeatedly to drill or test, and record a user's progress. The first time through the sequence the user is guided, but subsequent times through the sequence the user is left to try to remember the actions, progress is tracked and scored by checking how well their actual interactions correspond with the stored instructions, and based on the score they are asked to repeat the sequence or left to continue to the next. This process may be done for an entire set of instructions or it may be done on sub-sections, such that one must first satisfactorily pass the first before moving onto the next.

In a learning system or gaming application, the scores can also be stored, shared across devices so user can not only track their progress, but compare and compete with other users.

Groups of Indicators

In situations where multiple groups of simultaneous interactions are to occur at various locations along an axis of the display, such as would be the case when guiding a user to interact with the trumpet embodiment of FIG. 11, many indicators would be displayed and a user may have difficulty discerning the various groups. An alternative method of displaying indicators, particularly in the preparation phase may be preferred.

Figure 38A:
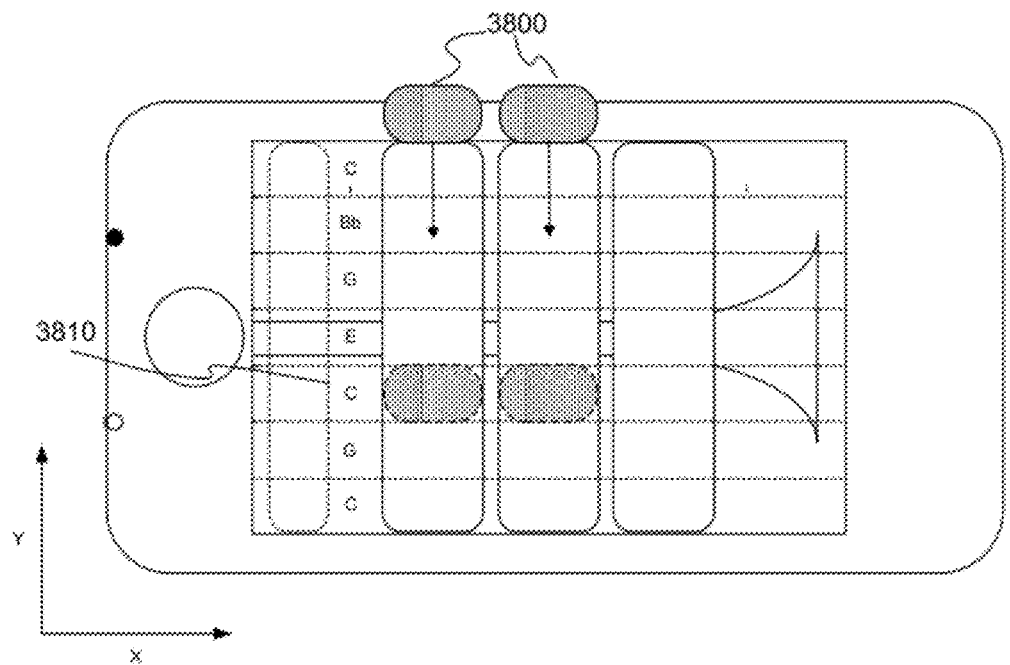
FIGS. 38A,B are diagrams showing variation of grouped Indicators by position over time to prepare a user for interaction.
Figure 38B:
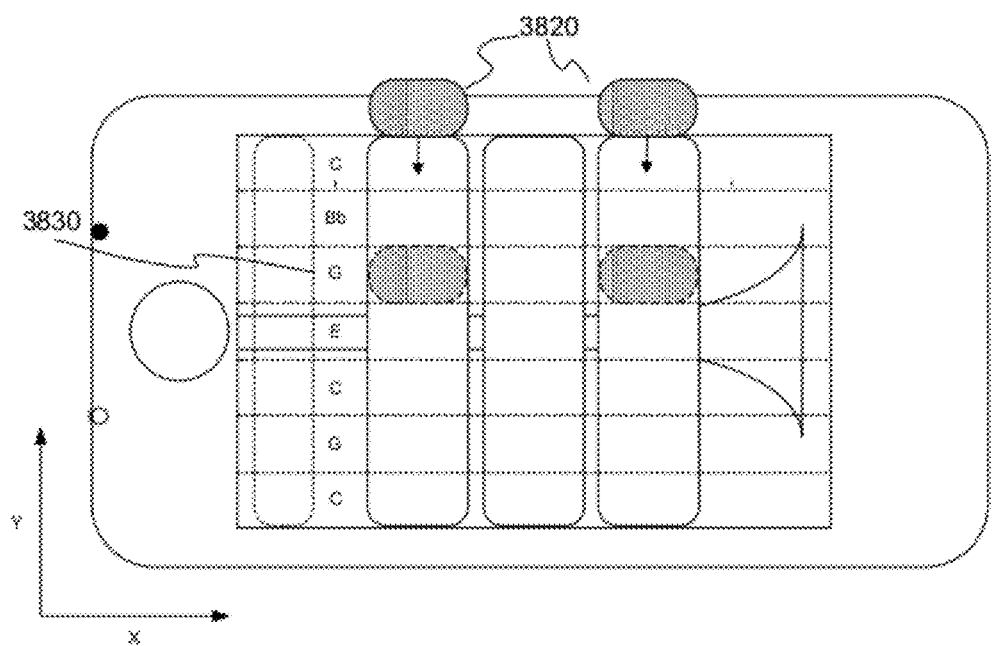
FIG. 38B shows grouped indicators destined for a higher partial with a low velocity.

In an alternate method of indicating preparation for an interaction, rectangular indicators 3800 are slid along an axis, in this case the y axis. Regardless of the destination along the axis, they are started at the same origin (in this embodiment of FIG. 38A, off the screen) and travel at various velocities depending on their destination level such that they arrive by the time the preparation time has elapsed. In a preferred embodiment the position relative to the origin is a function of the time since the preparatory phase has been initiated. In this way, velocities of Indicators destined for lower partials will travel faster, than those destined for a higher partial. FIG. 38A shows a group of Indicators 3800 guiding the user to press the 1$^{st}$ and 2$^{nd}$ valves. FIG. 38B shows a group of Indicators 3820 guiding the user to press the 1$^{st}$ and 3$^{rd}$ valves. The Indicators of FIG. 38A are destined for 'C' partial 3810 just below the middle of the display, whereas the Indicators 3820 of FIG. 38B are destined for the 'G' partial 3830 above the middle of the display. Consequently the Indicators 3800 of FIG. 38A have farther to travel and have a higher velocity, whereas the Indicators 3820 of FIG. 38B have a lower velocity.

As an additional aid, colors are assigned to the partials and the color of the Indicators is set according to the destination partial. For example, red is assigned to the highest 'C' partial, followed by orange for 'Bb', yellow for 'G', green for 'E', light blue for 'C', dark blue for 'G' and purple for C. In this way, the Indicators 3800 of FIG. 38A would be colored light blue, whereas the Indicators 3820 of FIG. 38B would be colored yellow. Rather than color, pattern, texture or another visual property may be used to help distinguish Indicators destined for particular partials.

The invention has now been described with reference to the preferred embodiments. Alternatives and substitutions will now be apparent to persons of skill in the art.

What is claimed is:

1. A method for guiding a user, utilizing an electronic device and display, to interact with a wind musical instrument or a musical instrument modeled after a wind musical instrument wherein pitch of sound produced by said wind musical instrument is determined by a combination of a first user input and a second user input, said first user input related to controlling the frequency of vibration of the column of air inside said wind musical instrument, and second user input related to controlling the length or effective length of said wind musical instrument containing the column of air, said method comprising
 a. reading an instruction comprising a user interaction;
 b. determining positions of one or more action indicators in accordance with said instruction, wherein position of at least one of said one or more indicators along a first axis is related to contribution to pitch of said first user input, and position of each of said one or more indicators along a second axis is related to said second user input; and,
 c. displaying said one or more action indicators.

2. The method of claim 1 wherein said instruction further comprises a note to play, and determining positions further comprises determining positions in accordance with said note.

3. The method of claim 2 wherein said instruction further comprises a parameter used for indicating amplitude or amplitude related spectral characteristic of said note, and displaying further comprises displaying an indication of said parameter.

4. The method of claim 2 wherein said instruction further comprises an interaction time to play said note, and displaying comprises displaying said one or more indicators at said interaction time.

5. The method of claim 4 further comprising displaying, at a preparatory time prior to said interaction time, a preparatory indicator with visual attributes comprising attributes determined from said instruction, prior to said displaying said one or more an action indicators.

6. The method of claim 4 further comprising removing from display at least one of said indicators at a stop time corresponding to a time to stop playing said note, wherein the duration between said stop time and said interaction time is variable.

7. The method of claim 5 wherein said preparatory time is determined from a musical tempo.

8. The method of claim 5 further comprising visually transforming said one or more preparatory indicators.

9. The method of claim 8 wherein visually transforming comprises visually transforming one or more attributes selected from a group consisting of position, size, shape, line thickness, color, and transparency.

10. The method of claim 1 wherein said instruction further comprises an interaction time and displaying said one or more action indicators occurs at said interaction time, and the method further comprises displaying at a preparatory time, prior to said interaction time, at least one of said action indicators, and periodically transforming the scale of said at least one of said action indicators until reaching said interaction time, while, for each of said at least one of said action indicators, maintaining a substantially constant center position relative to an origin point on said display.

11. The method of claim 1 further comprising transforming the opacity of said at least one of said action indicators while said transforming the scale.

12. The method of claim 10 further comprising determining duration to play said note, and displaying said one or more action indicators further comprises displaying an indication of said duration.

13. The method of claim 1 wherein said instruction further comprises an interaction time and displaying said one or more action indicators occurs at said interaction time, and the method further comprises displaying at a preparatory time, prior to said interaction time, for at least one of said action indicators, a corresponding preparatory indicator, wherein initial position of each of said preparatory indicators is different from that of its corresponding action indicator, and periodically transforming the position of said one or more preparatory indicators until reaching said interaction time.

14. The method of claim 13 further comprising setting the color of said one or more preparatory indicators based on their final position at said interaction time.

15. A method for guiding a user, utilizing an electronic device and display, to play a musical instrument, comprising:
   a. reading an instruction, said instruction comprising a musical note to play and an action time to play said note;
   b. displaying an indicator at a time prior to said action time and at a position determined in accordance with said musical note, wherein said position is variable along two axes;
   c. transforming the scale of said indicator periodically until reaching a predetermined final scale while maintaining a substantially constant center position, along said two axes, relative to an origin point on said display.

16. The method of claim 7 further comprising setting the color of said indicator to correspond to a particular action final position.

17. The method of claim 7 wherein said instruction further comprises a parameter used for indicating amplitude or amplitude related spectral characteristic of said note, and displaying further comprises displaying an indication of said parameter.

18. A computer readable memory comprising computer code for implementing a method for guiding a user, utilizing an electronic device and display, to interact with a wind musical instrument or a musical instrument modeled after a wind musical instrument wherein pitch of sound produced by said wind musical instrument is determined by a combination of a first user input and a second user input, said first user input related to controlling the frequency of vibration of the column of air inside said wind musical instrument, and second user input related to controlling the length or effective length of said wind musical instrument containing the column of air, the method for guiding a user comprising
   a. reading an instruction comprising a user interaction;
   b. determining positions of one or more action indicators in accordance with said instruction, wherein position of at least one of said one or more indicators along a first axis is related to contribution to pitch of said first user input, and position of each of said one or more indicators along a second axis is related to said second user input; and,
   c. displaying said one or more action indicators 19. The computer readable memory of claim 18 wherein said instruction of said method further comprises an interaction time and displaying said one or more action indicators occurs at said interaction time, and the method further comprises displaying at a preparatory time, prior to said interaction time, at least one of said action indicators, and periodically transforming the scale of said at least one of said action indicators until reaching said interaction time, while, for each of said at least one of said action indicators, maintaining a substantially constant center position relative to an origin point on said display.

20. The computer readable memory of claim 18 wherein said instruction of said method further comprises an interaction time and displaying said one or more action indicators occurs at said interaction time, and the method further comprises displaying at a preparatory time, prior to said interaction time, for at least one of said action indicators, a corresponding preparatory indicator, wherein initial position of each of said preparatory indicators is different from that of its corresponding action indicator, and periodically transforming the position of said one or more preparatory indicators until reaching said interaction time.

* * * * *